United States Patent [19]

McElwain

[11] 4,350,200

[45] Sep. 21, 1982

[54] SOLAR ENERGY COLLECTOR AND SYSTEM

[76] Inventor: John A. McElwain, Calle Fray Luis DeLeon 4-Entl.°, Palma de Mallorca, Spain

[21] Appl. No.: 105,936

[22] Filed: Dec. 21, 1979

Related U.S. Application Data

[63] Continuation-in-part of Ser. No. 927,048, Jul. 24, 1978, abandoned.

[51] Int. Cl.³ .............................................. F25B 29/00
[52] U.S. Cl. ................................... 165/48 S; 165/49; 165/50; 165/54; 165/96; 165/104.19; 62/235.1; 62/238.3; 62/324.2; 126/428; 126/430; 126/431; 126/435
[58] Field of Search ..................... 165/18, 96, 29, 49, 165/45, 48, 48 S, 53, 54, 56, 62, 104 S, 50; 62/2, 238 B, 324 B; 237/2 B; 126/400, 428, 429, 431, 430, 435, 437

[56] References Cited

U.S. PATENT DOCUMENTS

| | | | |
|---|---|---|---|
| 2,559,869 | 7/1951 | Gay | 165/49 |
| 2,713,252 | 7/1955 | Jackson et al. | 165/18 |
| 3,935,899 | 2/1976 | Jolly | 165/29 |
| 4,007,776 | 2/1977 | Alkasab | 165/18 |
| 4,037,650 | 7/1977 | Randall | 165/18 X |
| 4,143,642 | 3/1979 | Beaulieu | 126/435 |
| 4,153,104 | 5/1979 | Ruder | 165/48 S |
| 4,196,719 | 4/1980 | Skrivseth | 165/18 X |
| 4,237,859 | 12/1980 | Goettl | 165/45 X |
| 4,242,872 | 1/1981 | Shaw | 62/2 |
| 4,249,512 | 2/1981 | Rivetti et al. | 126/435 |

Primary Examiner—Samuel Scott
Assistant Examiner—Margaret A. Focarino

[57] ABSTRACT

Solar collectors whose absorbers are made of a conventional building material form the outer surface of the roof and wall of a building. Air flows behind the absorbers and heat is transferred to the air by expanded metal conductors which extend from adjacent the outside surfaces of the absorbers into the flow passages. Heat from the collectors is stored in a system including a cold tank of liquid, a heat tank of liquid at a higher temperature, and a hot water tank of liquid at an even higher temperature. A heat pump may transfer heat from the cold tank to the heat tank and from the heat tank to the hot water tank. Cold and heat exchangers are provided in each tank for receiving heated air from the collectors and transferring heat therefrom to the liquid in the tank; and the exchangers in the cold and heat tanks transfer heat between the liquid in the tanks and air from or to the building. Air flows to and from the collectors, tanks, and buildings in ducts formed by the floor and roof beams and wall slabs.

24 Claims, 45 Drawing Figures

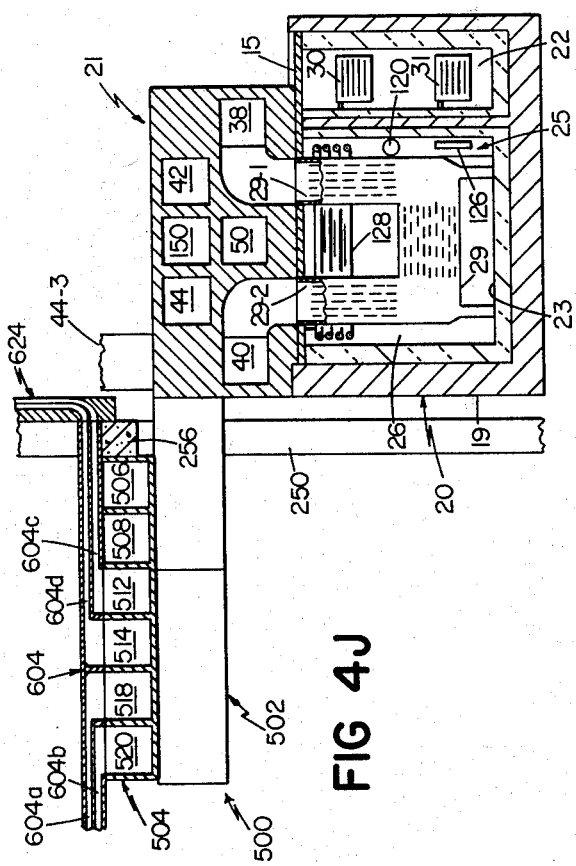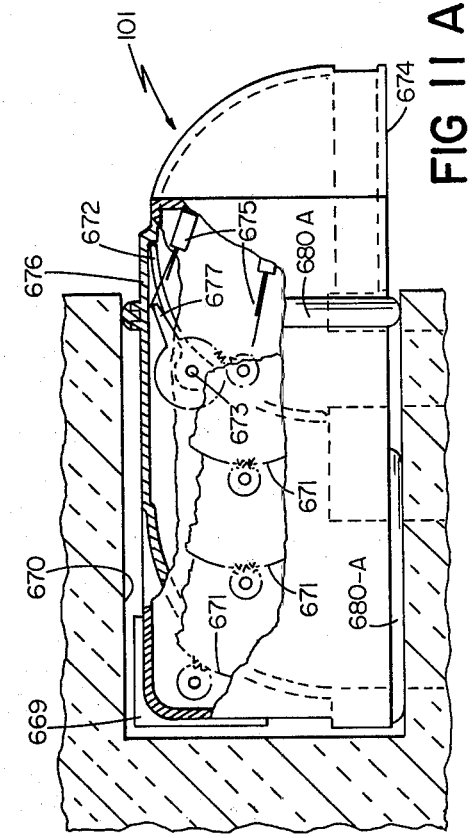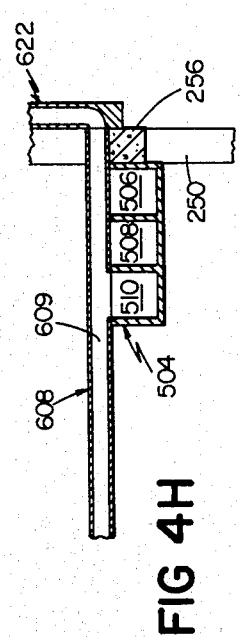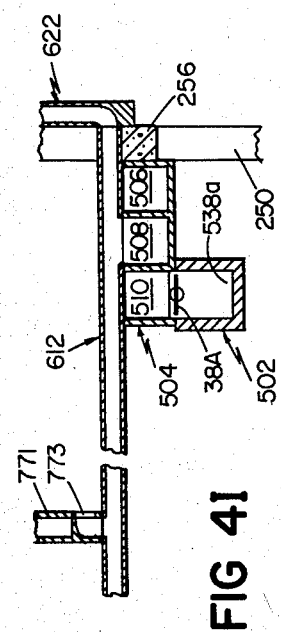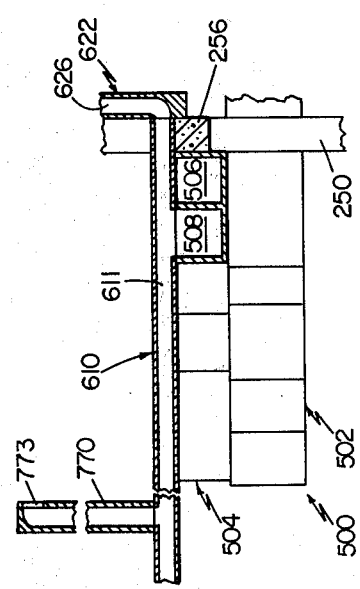

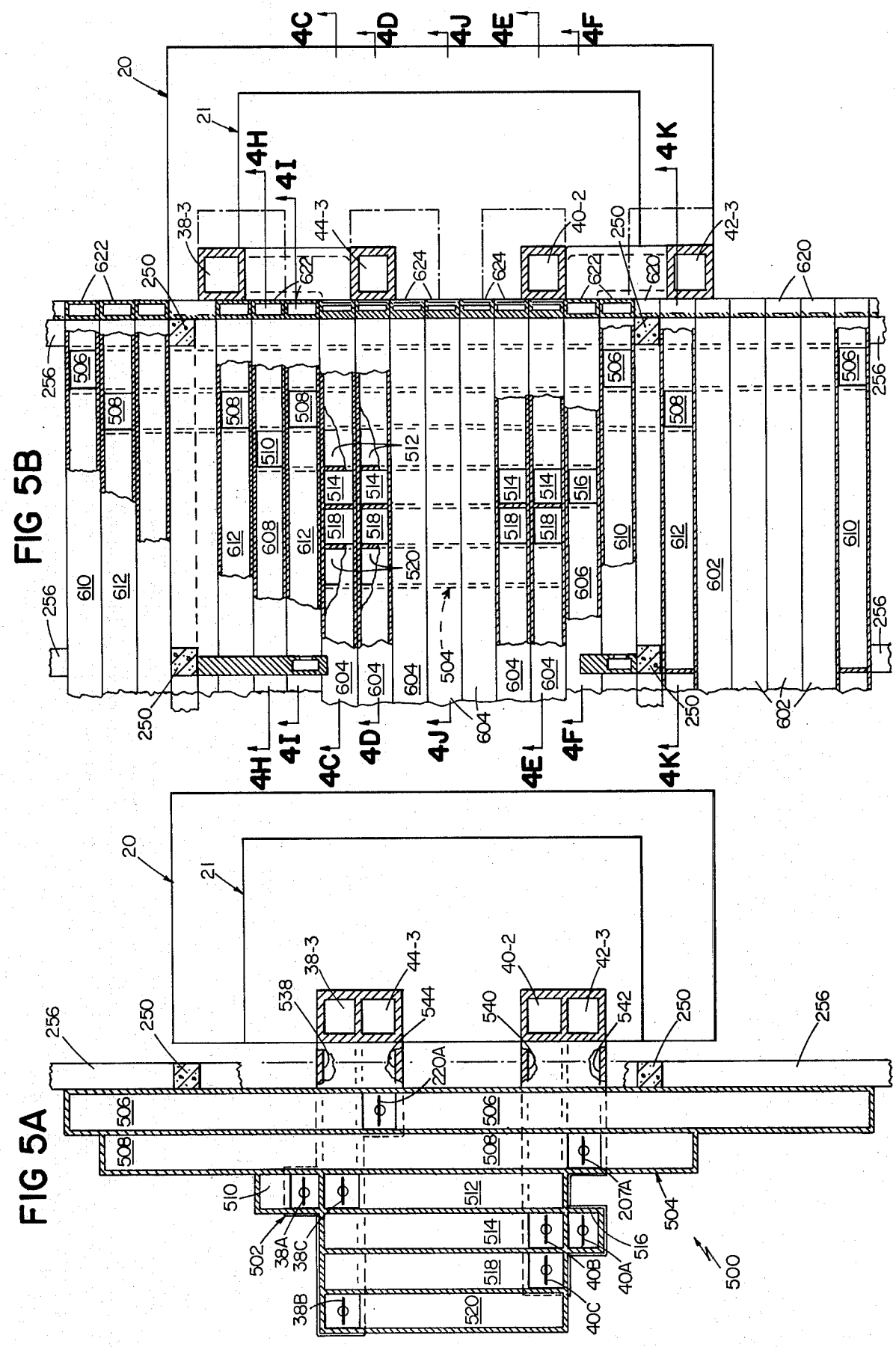

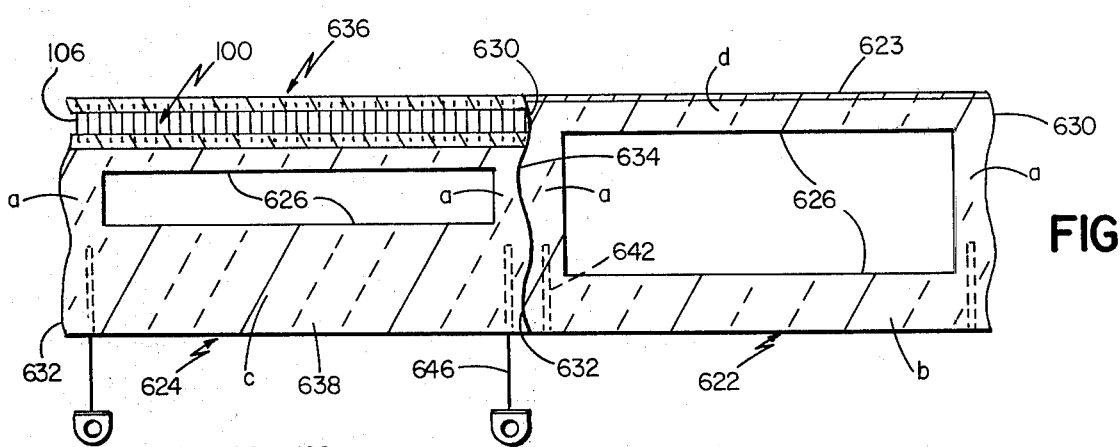
FIG 7
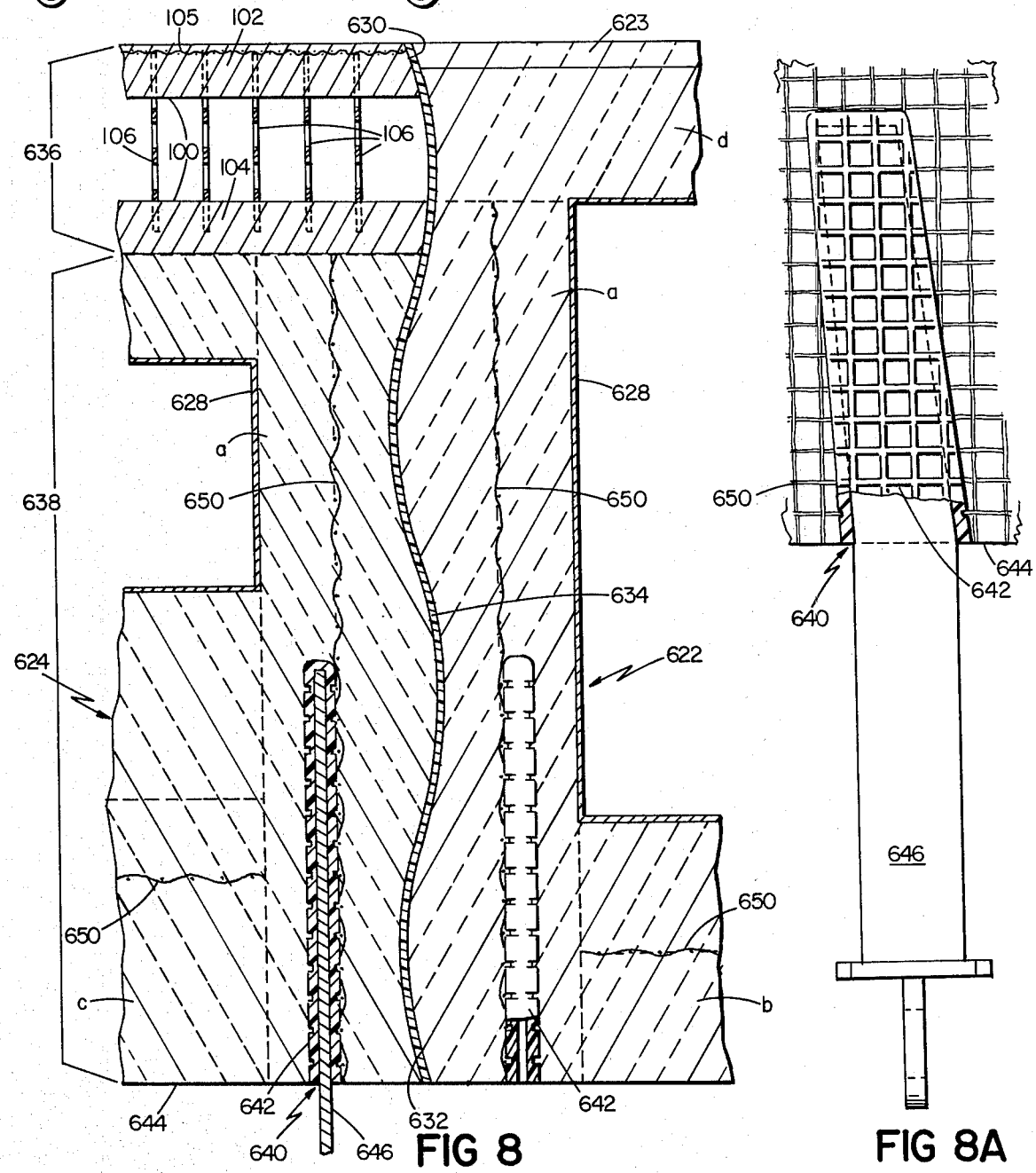
FIG 8
FIG 8A

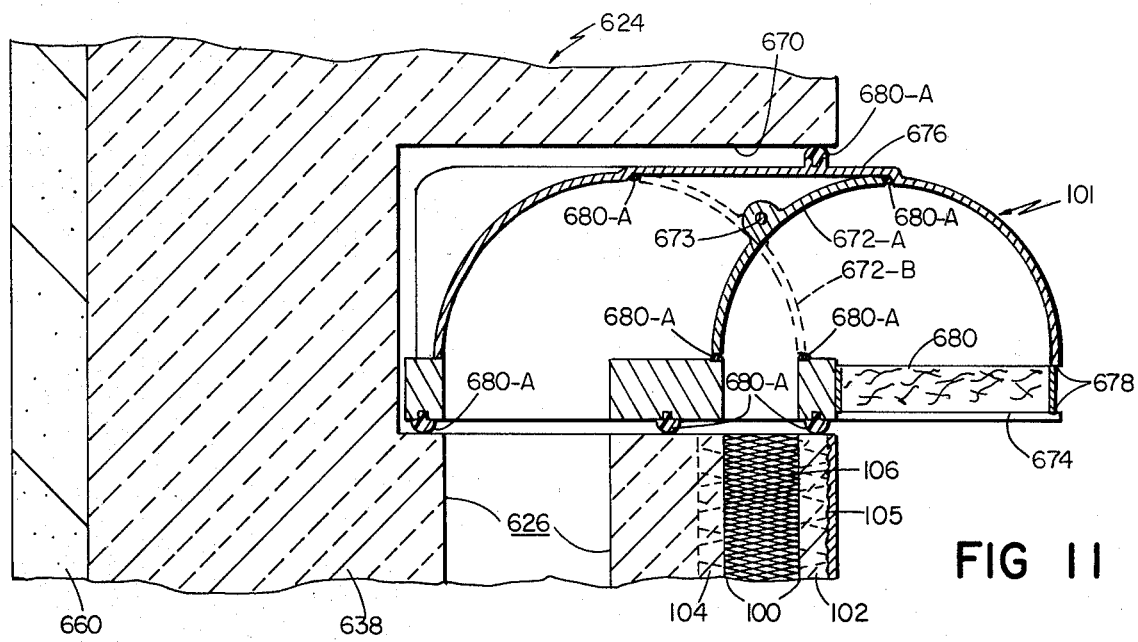
FIG 11
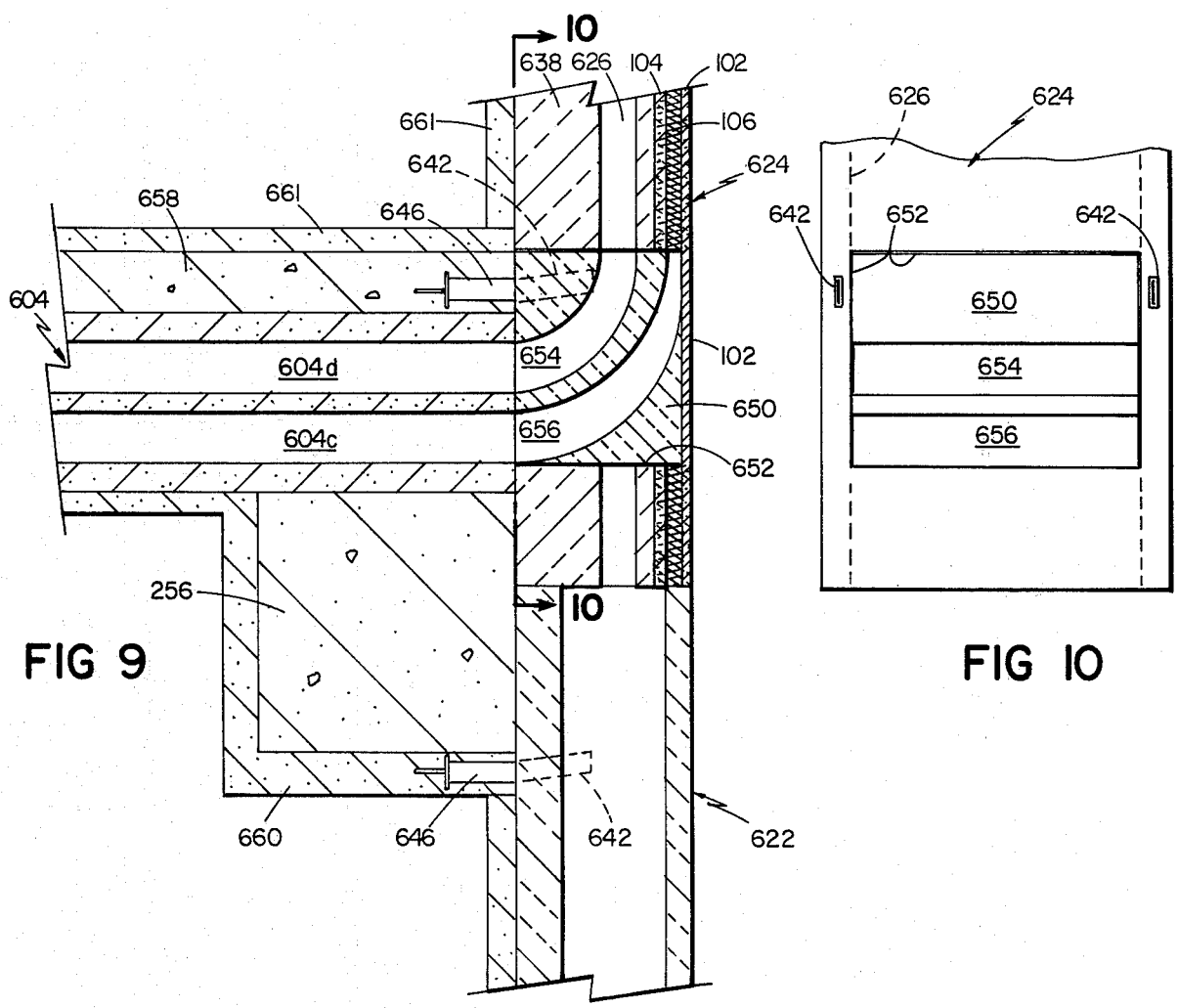
FIG 9
FIG 10

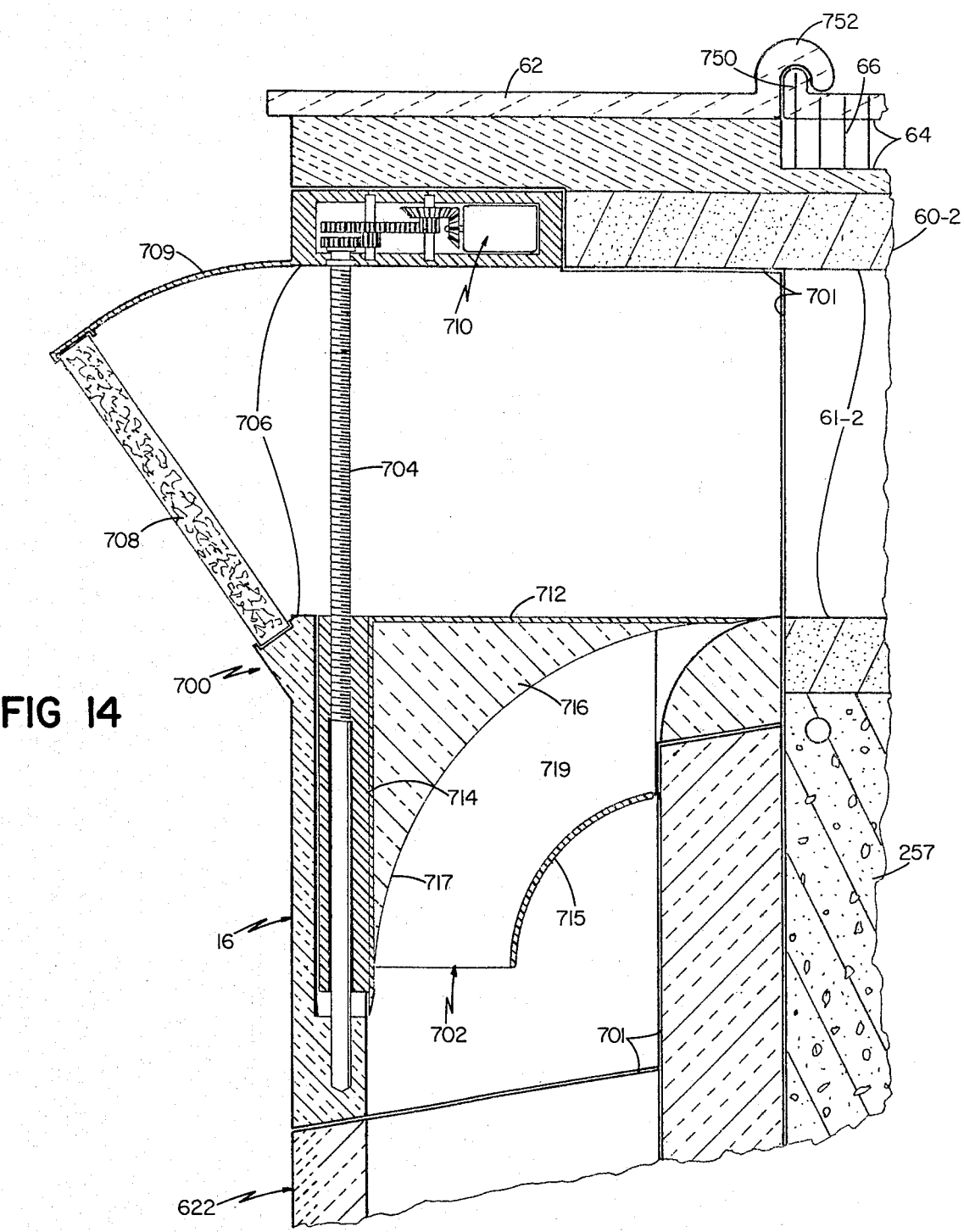

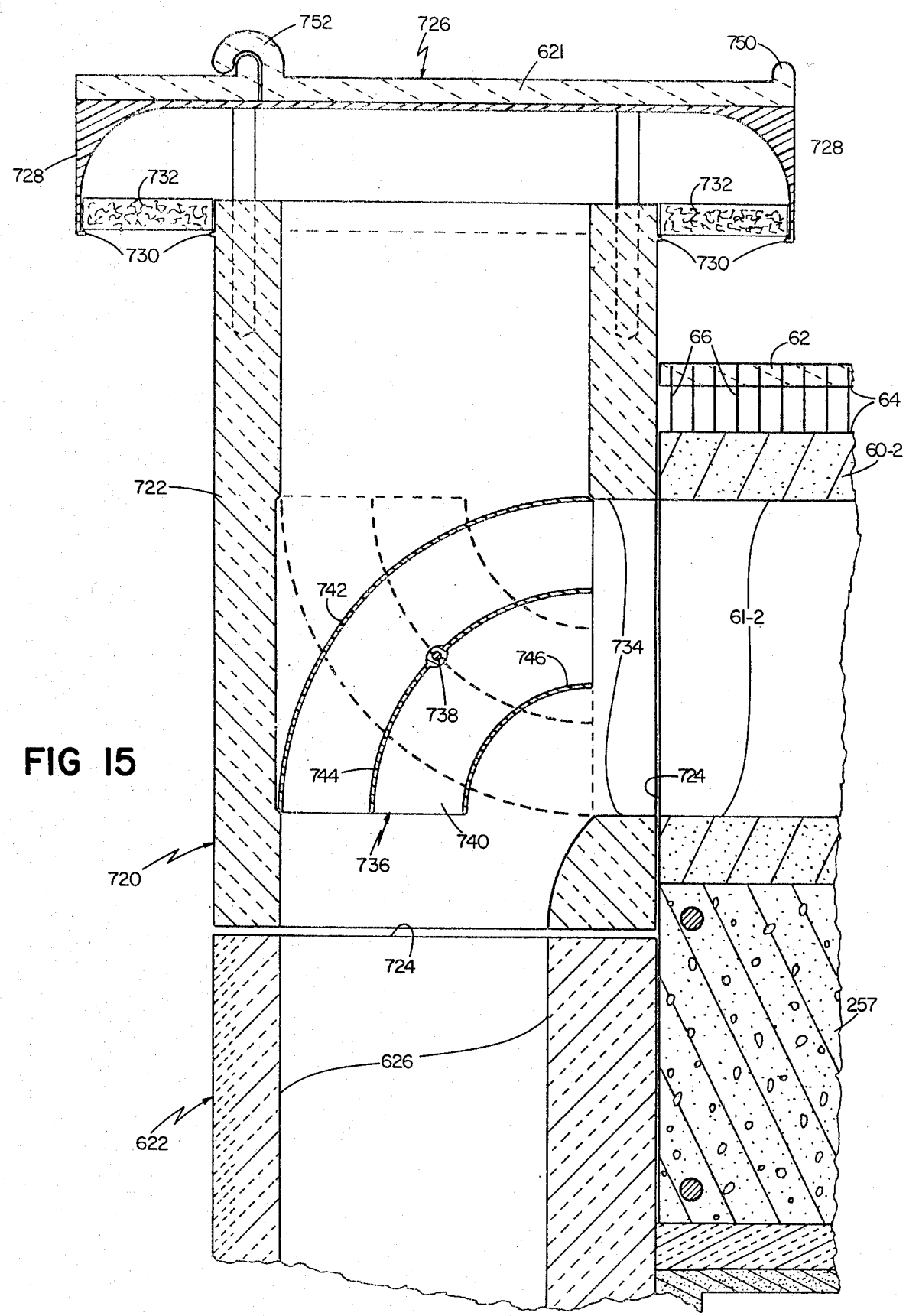

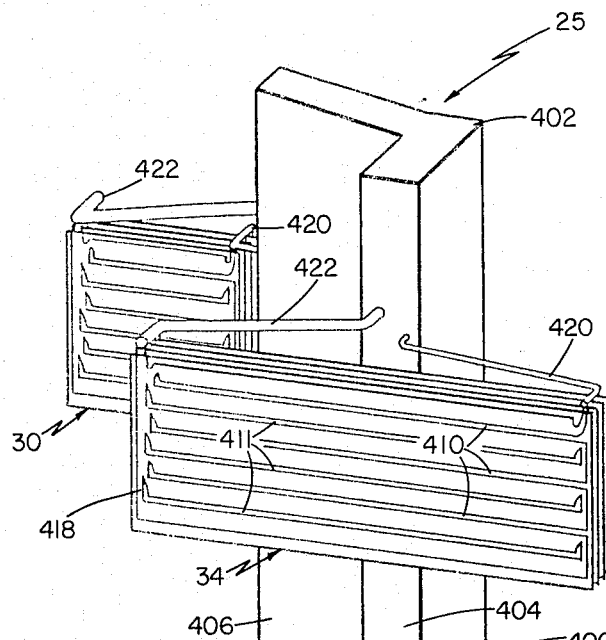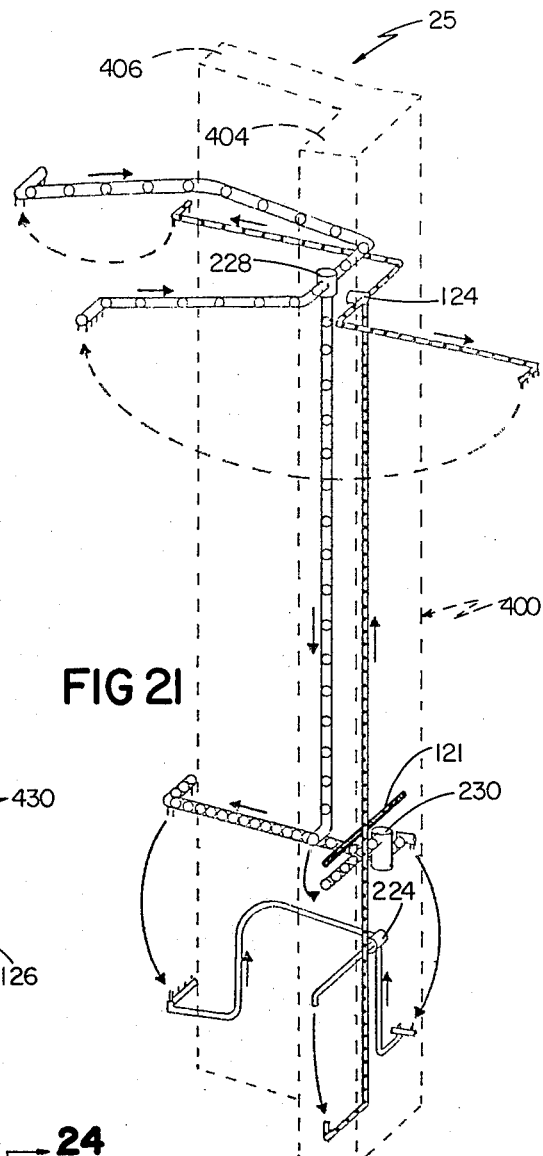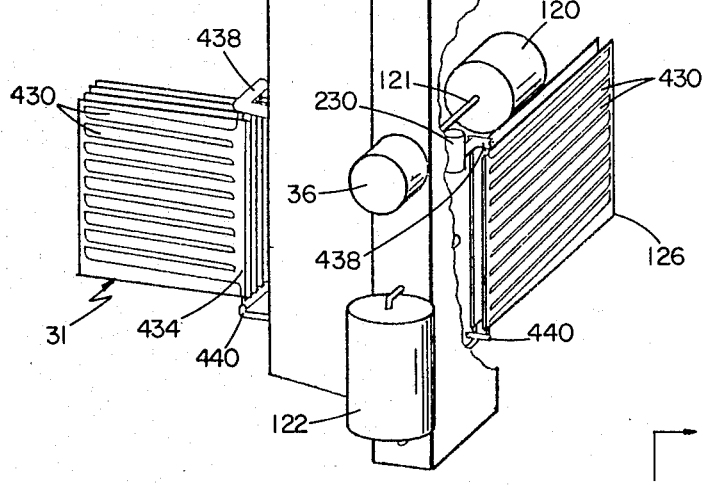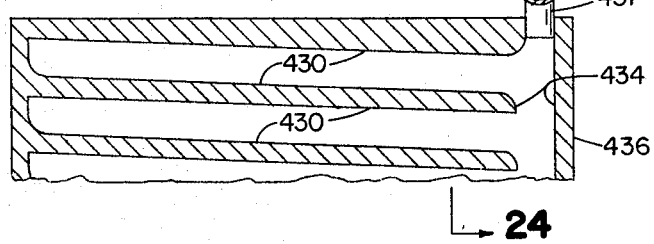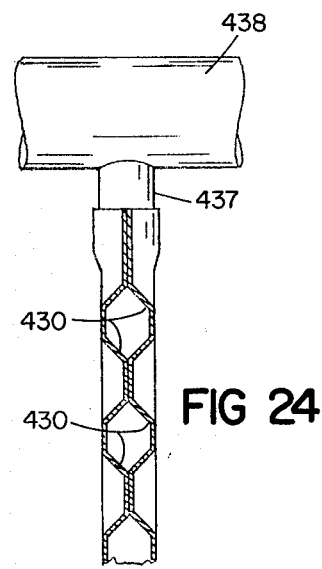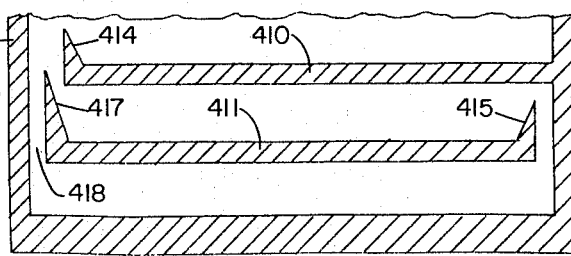
FIG 20 FIG 21 FIG 22 FIG 23 FIG 24

SOLAR ENERGY COLLECTOR AND SYSTEM

This application is a continuation-in-part of prior application Ser. No. 927,048, filed July 24, 1978, now abandoned, which prior application is here incorporated by reference. For convenience in comparison and to assist in understanding, corresponding portions of the systems of the prior and present application are, to a major extent, identified by the same reference numerals.

This invention relates to solar heating and, more particularly, to collection, storage, and distribution systems for a solar heated house.

A principal object of one aspect of the present invention is to provide a compact, efficient, and relatively inexpensive system for storing collected solar heat, and for controlling the necessary fluid (typically, air) flows into, through and from the storage system. A principal object of a second aspect is to provide a system for air flow to and from solar collectors and the living space that is compatible and integral with conventional construction. Other objects include providing improved and inexpensive controls and components for such systems.

In one aspect, the invention features a system, especially designed for use in conjunction with an air solar collector, including a cold tank of liquid in which heat is stored at a relatively low temperature, a heat tank of liquid at a relatively higher temperature, a heat pump for transferring heat directly from the cold tank to the heat tank, and cold and heat exchangers in, respectively, the cold and heat tanks each having a fluid inlet and a fluid outlet and arranged for transferring heat between liquid in the respective tank and fluid flowing through the exchanger. In preferred embodiments including a hot water tank, a heat pump for transferring heat directly from the heat or cold tank to the hot water tank, and a heat exchanger in the hot water tank, fluid to or from either a selected air source (e.g., a selected solar collector) or the space to be heated may be passed through any one of the exchangers as desired, air may be dehumidified and then heated by passing it successively through the cold tank and heat tanks and then to the space to be heated.

Other principal features of the invention include an air handler of modular multi-block construction in which control dampers are sandwiched between adjacent blocks and control flow through ducting extending through selected blocks, an air distributor comprising two levels of longitudinally extending ducts, the ducts of one level extending perpendicular to those in the other level and defining control ports between the two levels, for directing flow between the air handler and/or the space to be heated and for solar collector(s), structural plank beams and wall slabs which define all necessary ducting within the building to be heated or cooled, use of low cost plastic and light-weight concrete materials for such duct-defining members, and a heat pump module mounted at the junction of the heat, cold and hot water tanks and including a heat transfer element positioned within each tank.

Other objects, features, and advantages will appear from the following detailed description of a preferred embodiment of the invention, taken together with the attached drawings in which:

FIGS. 4A-4J are sectional views of portions of the air handler and distribution systems;

FIGS. 5A and 5B are plan views, partially in section, of portions of the distribution system;

FIG. 7 is a sectional view of two vertical curtain wall slabs;

FIG. 8 is an enlarged sectional view of portions of the slabs of FIG. 7;

FIG. 8A is an enlarged sectional view of a portion of the wall slab with sword and scabbard fastener;

FIG. 9 is a sectional view of the duct connection between a floor plank beam and a wall slab having a collector duct;

FIG. 10 is a section taken at line taken at line 10—10 of FIG. 9;

FIG. 11 is a sectional view of a wall portion with damper of the residence of FIG. 1;

FIG. 11A is a plan view of the damper of FIG. 11;

FIGS. 12-15 are sectional views of portions of a roof and wall of the residence of FIG. 1;

FIG. 20 is a perspective view, partially broken away, of the heat pump module;

FIG. 21 is a perspective view of portions of the heat pump module;

FIGS. 22-24 are sectional views of portions of the heat pump module.

Figure 28:
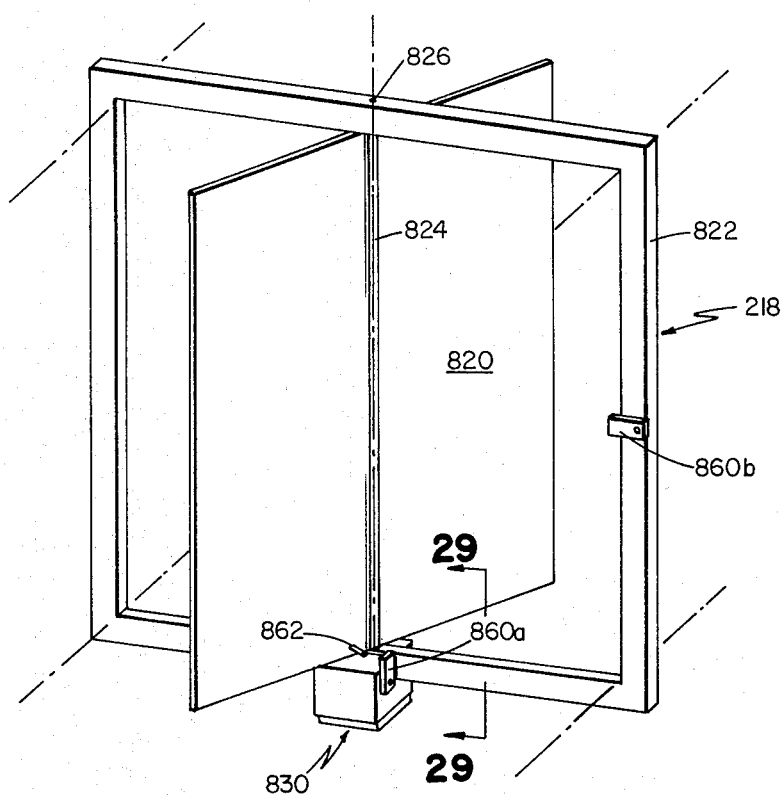
FIG. 28 is a perspective view of a damper.
Figure 31:
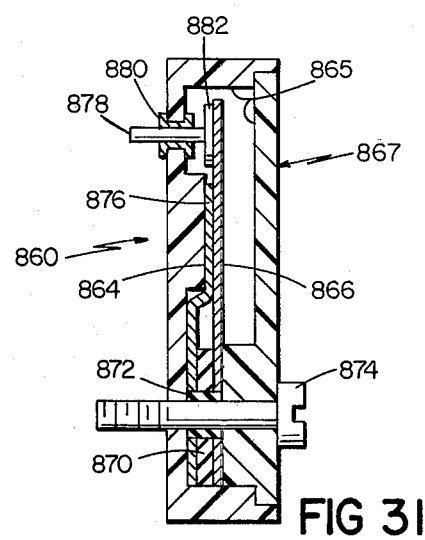
Figure 29:
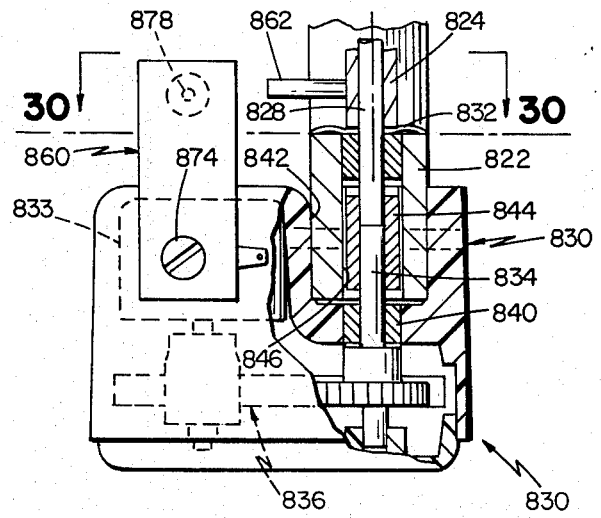
Figure 30:
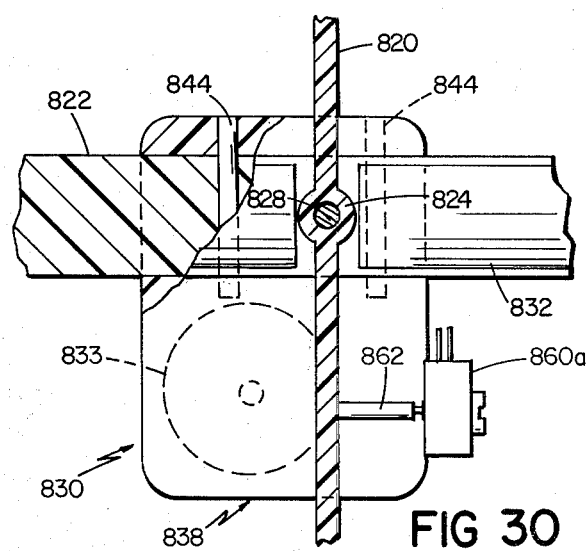

FIGS. 29 and 30 are sectional views taken, respectively, at lines 29—29 of FIG. 28 and lines 30—30 of FIG. 29;

FIG. 31 is a sectional view of a switch; and

Figure 32:
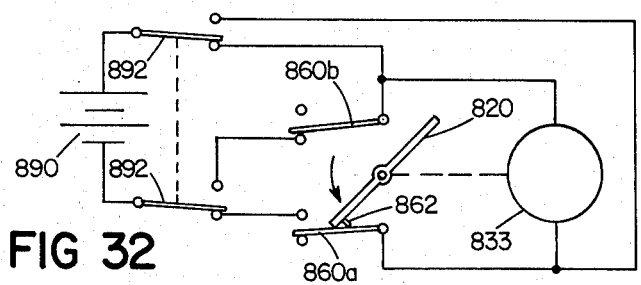

FIG. 32 is a schematic of a control unit including the switch of FIG. 31.

Figure 1:
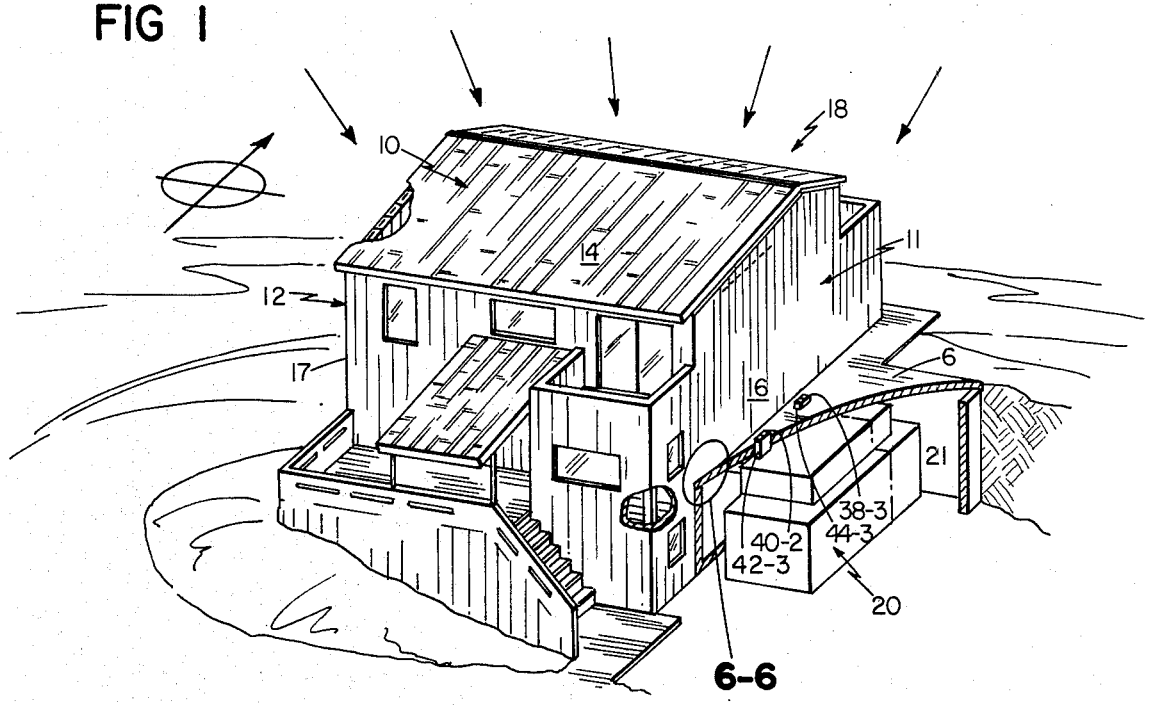
FIG. 1 is a perspective view of a residence having solar systems constructed in accord with the present invention.
Figure 2:
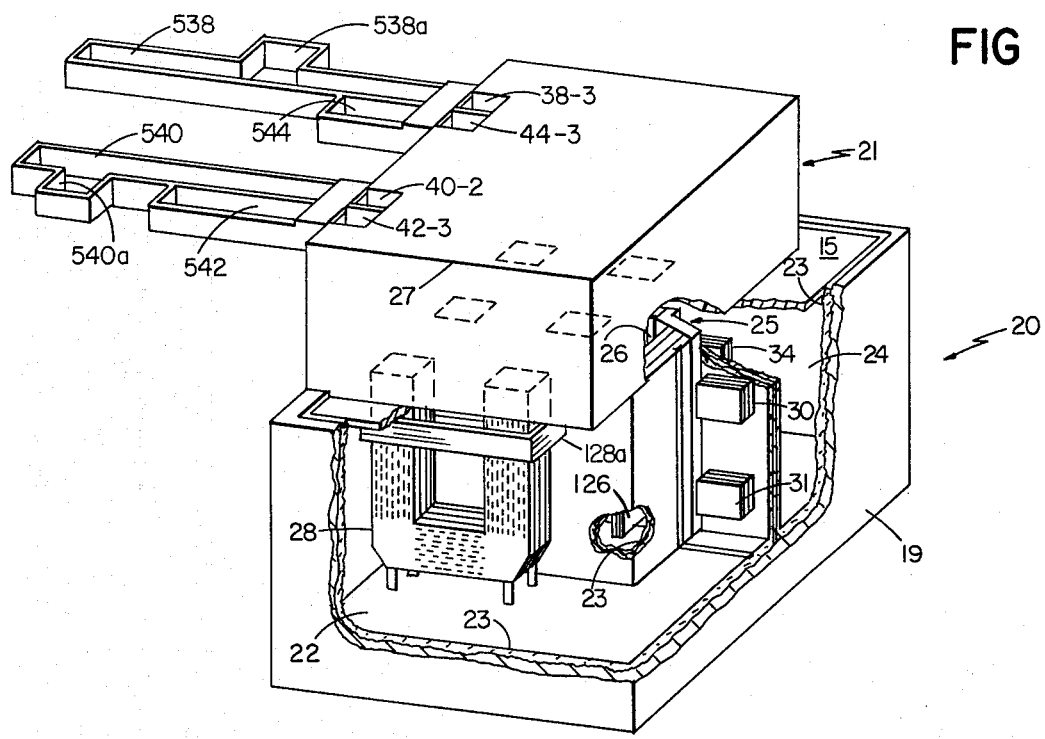
FIG. 2 is a perspective view, partially in section, of the storage system and portions of the distribution system of the residence of FIG. 1.
Figure 3:
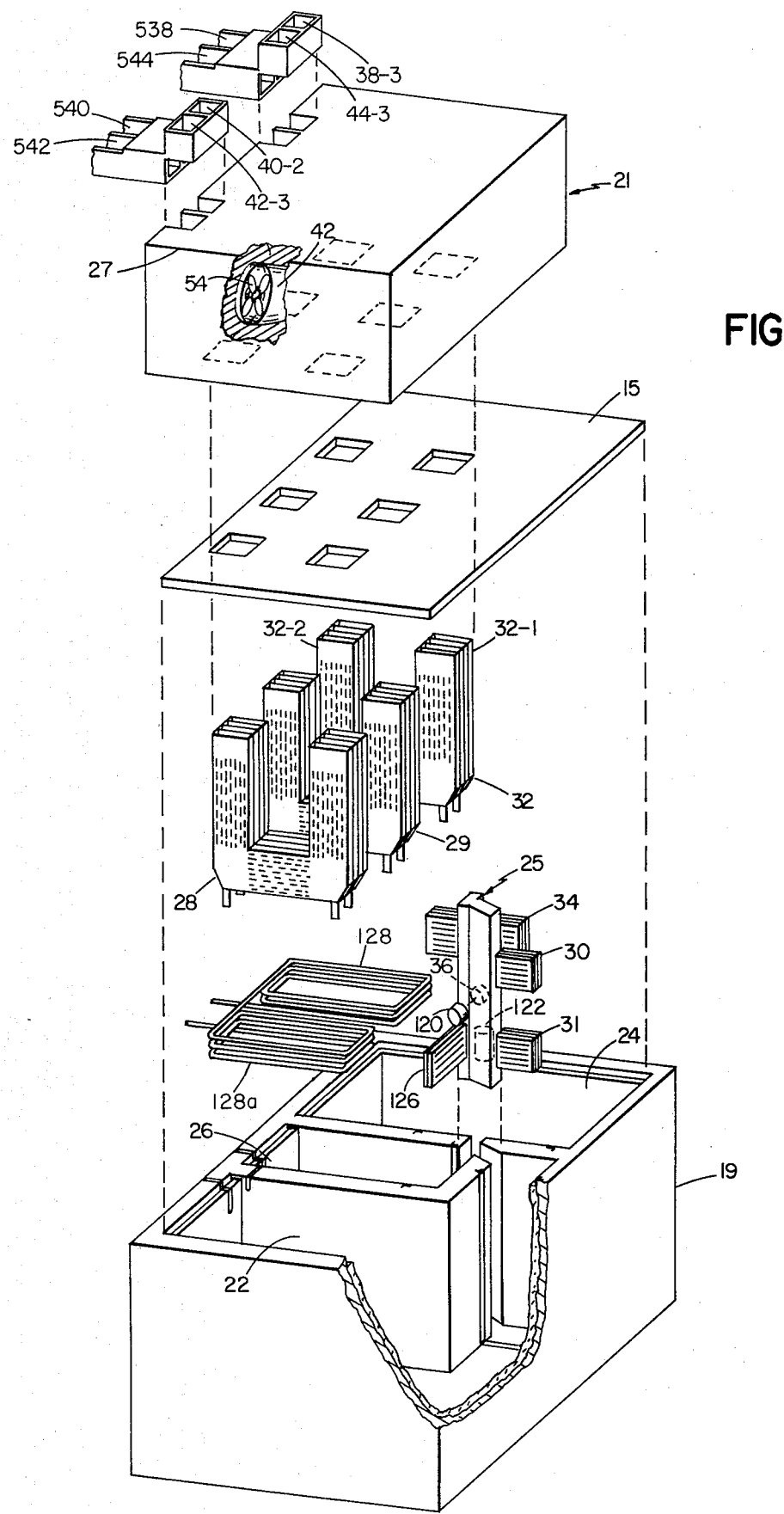
FIG. 3 is an exploded perspective view, partially in section, of portions of the storage system and distribution system of FIG. 2.

Referring now to FIGS. 1 through 3, solar collectors 10, 11, and 12 in, respectively, the south facing roof 14 and east and west facing walls 16, 17 of a single family residence 18 are connected by ductwork to a storage system 20 and an air handler 21. The storage system 20 comprises a large concrete tank 19 divided by interior vertical concrete walls into a heat tank 22, a cold tank 24 and a domestic hot water tank 26. The inside of each tank is lined with an insulating layer 23 of, for example, high density cellular polystyrene; and each tank is filled with water which serves as a substantially constant temperature heat sink. The illustrated embodiment is designed for use in a climate such as that in Spain, but wall collectors typically used in a colder climate are included for illustrative purposes. Cold tank 24 contains approximately 8 cubic meters of about 50° F. water; heat tank 22 approximately 8 cubic meters of water at 90° F. to 100° F.; and hot water tank 26 approximately 2 cubic meters of water at about 125° F. Air-water heat exchangers 28 and 29 and air-water cold exchanger 32 are mounted, respectively, in heat tank 22, hot water tank 26 and cold tank 24. A heat pump module 25 is mounted at the junction of tanks 22, 24, 26, for transferring heat between the tanks; and a water-to-water heat exchanger 128 for heating domestic hot water is mounted in heat tank 22 and includes a coil 128A in hot water tank 26. As shown, module 25 includes a condenser 31 and evaporator 30 mounted within heat tank 22, an evaporator 34 and a compressor 36 mounted in cold tank 24, and a condenser 126 in hot water tank 26.

As shown, storage system 20 is located in the basement, i.e., below the first floor, of residence 10; and although not so shown, it is often desirable to locate the system in the center of the house, below the basement floor. Air handler 21 is mounted on the top cover 15 of the concrete tank 19 of storage system 20 and comprises a large number of cubical or rectangular blocks of a semi-rigid cellular plastic such as polystyrene. As described in detail hereinafter, various blocks are hollowed out or cut-away as required to provide the necessary air flow paths within the air handler; and motor controlled dampers are mounted between adjacent blocks as required to control air flow. Duct sizes are variable. Those shown are generally 40 centimeters square with 10 centimeters between them.

Air handler 21 is itself connected directly to heat and cold exchangers 28, 29 and 32; and, through an air distributor generally designated 500, to ducts within the residence and to collectors 10, 11, 12 and to the outside. The air handler provides for air flow, as desired, between collectors 10, 11, 12 and any one of exchangers 28, 29, 32; between either cold exchanger 32 or heat exchanger 28 and the rooms within residence 18; and to and from the outside. As discussed in detail in prior application Ser. No. 927,048, and as will become clearer hereafter, there are over 50 different air flow patterns, and the particular air flow path provided by the air handler will depend, inter alia, on outside climate and interior temperature, humidity and fresh air conditions and storage tank temperatures.

Figure 4A:
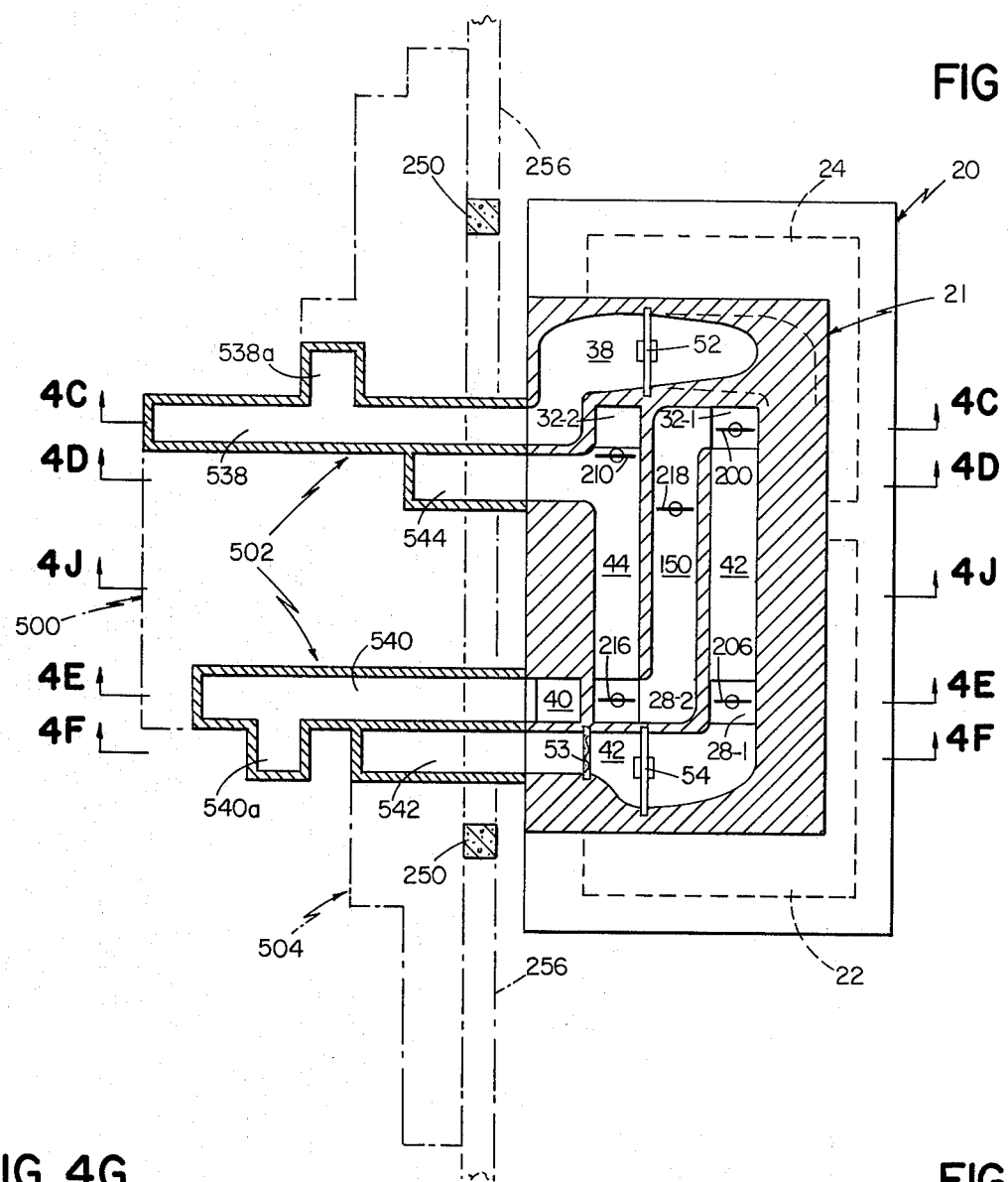

Referring now to FIGS. 4A-4J, the blocks forming air handler 21 are arranged in two horizontal layers, each eight (8) blocks long and five (5) blocks wide. The principal airflow passages or ducts defined by the cutout portions of the blocks are collector ducts 38 and 40, which provide for flow from and to the collectors, and distribution ducts 42 and 44 providing for distribution to and from residence 18, or vice versa. As shown, collector duct 38 delivers air to or from one side, designated 28-1, 29-1 and 32-1, of each of heat and cold exchangers 28, 29 and 32, while collector duct 40 is connected to the other side, 28-2, 29-2, 32-2 of the exchangers. Distribution duct 42 is connected to the side 28-1 and 32-1 of exchangers 28, 32; and distribution duct 44 is connected to side 28-2, 32-2 of the same two exchangers. The major portions of ducts 38, 40 are in the lower layer of the blocks making up air handler 21 (FIG. 4B); and the most of ducts 42, 44 are in the upper block layer (FIG. 4A). Also in the lower layer (FIG. 4B) is a cross-over duct 50 connecting collector duct 38 (at side 28-1 of heat exchanger 28) to collector duct 40 (at side 32-2 of cold exchanger 32). In the upper layer (FIG. 4A) cross-over duct 150 connects residence duct 42 (at side 32-1 of cold exchanger 32) to residence duct 44 (at side 28-2 of heat exchanger 28).

A reversible, variable speed blower 52 is mounted in the portion of collector duct 38 extending from the connection to air distributor 500 (in the upper block layer) to the main portion of the duct 38 (in the lower block layer). Blower 52 is sandwiched in place between four of the adjacent blocks, two in each of the upper and lower layers of blocks of the air handler. A similar blower 54 is mounted in the portions of residence duct 42 extending from the connection to air distributor 500, sandwiched between two of the blocks forming the upper layer of the air handler 21. An air filter 53 is also mounted in residence duct 42, between blower 54 and the connection to distributor 500.

Sixteen motorized dampers, designated 39, 200, 202, 204, 206, 207, 210, 212, 214, 216, 218, 220, 222, 305, 307, and 309, are mounted in air handler 21 to control air flow in and through the air handler. Dampers 200, 206, and 216 are mounted horizontally between the two layers of blocks forming air handler 21 and control flow, respectively, in duct 42 adjacent the exchanger side 32-1, in duct 42 adjacent exchanger side 28-1, and in duct 44 adjacent exchanger side 28-2. Dampers 39, 207, 220, and 309 are mounted horizontally at the top of the air handler between, respectively, duct 38 and fresh air duct 38-3, duct 42 and fresh air duct 42-3, duct 44 and fresh air duct 44-3, and duct 40 and fresh air duct 40-2.

The other dampers of air handler 21 are all mounted vertically, sandwiched between blocks in either the upper layer (dampers 210 and 218) or lower layer (dampers 202, 204, 212, 214, 222, 305, and 307) of the air handler. The two upper layer dampers, 210 and 218, control flow, respectively, from exchanger side 32-2 to duct 44, and in cross-over duct 150. In the lower level, dampers 202, 305, and 204 control flow through collector duct 38 to, respectively, exchanger sides 32-1, 29-1 and 28-1; dampers 212, 307, and 214 control flow from exchanger sides 32-2, 29-2 and 28-2 to collector duct 40; and damper 222 controls flows through cross-over duct 50.

Figure 4G:
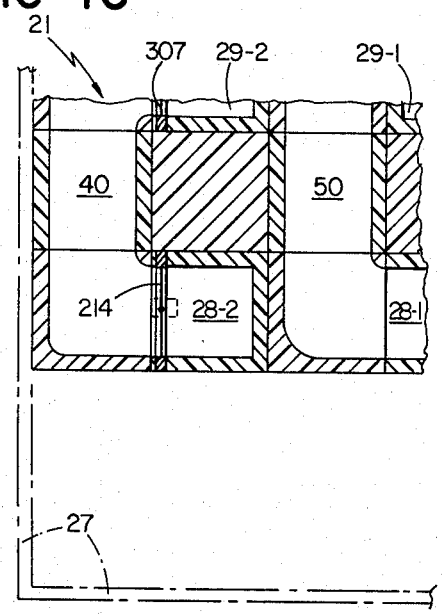
Figure 4B:
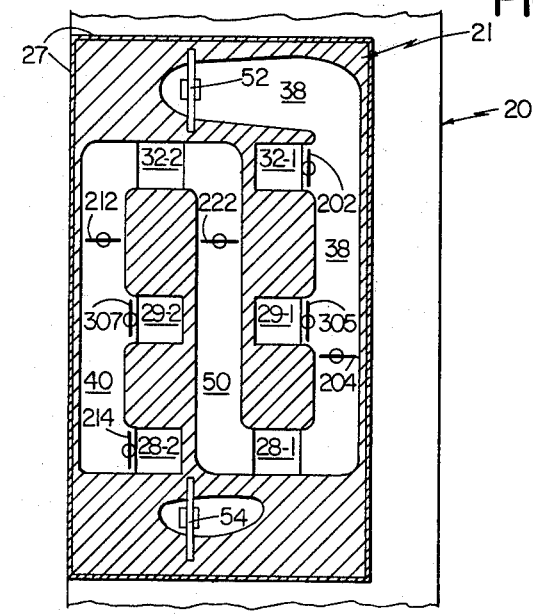
Figure 4C:
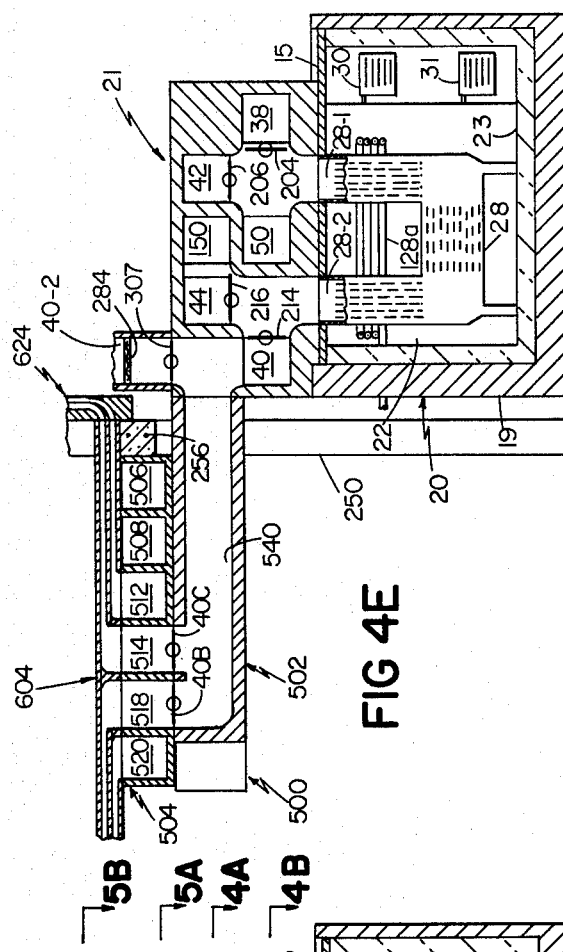
Figure 4E:
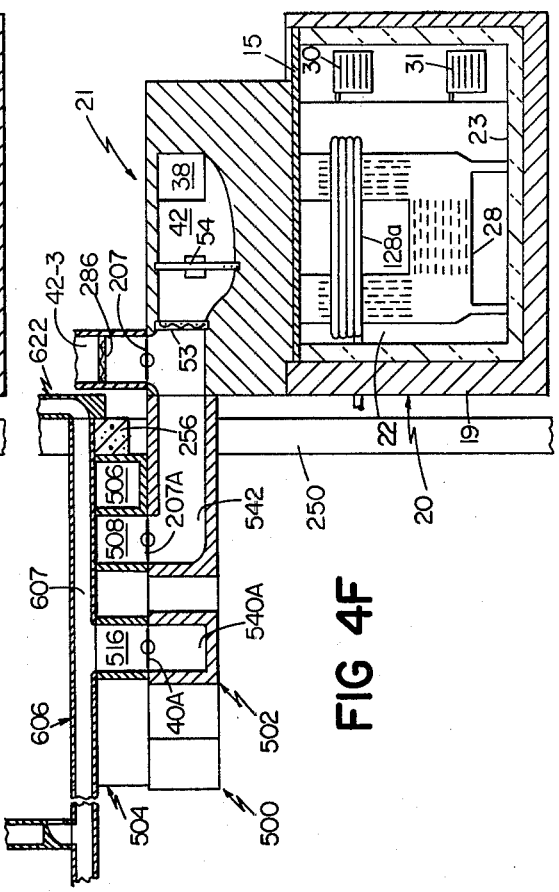
Figure 4D:
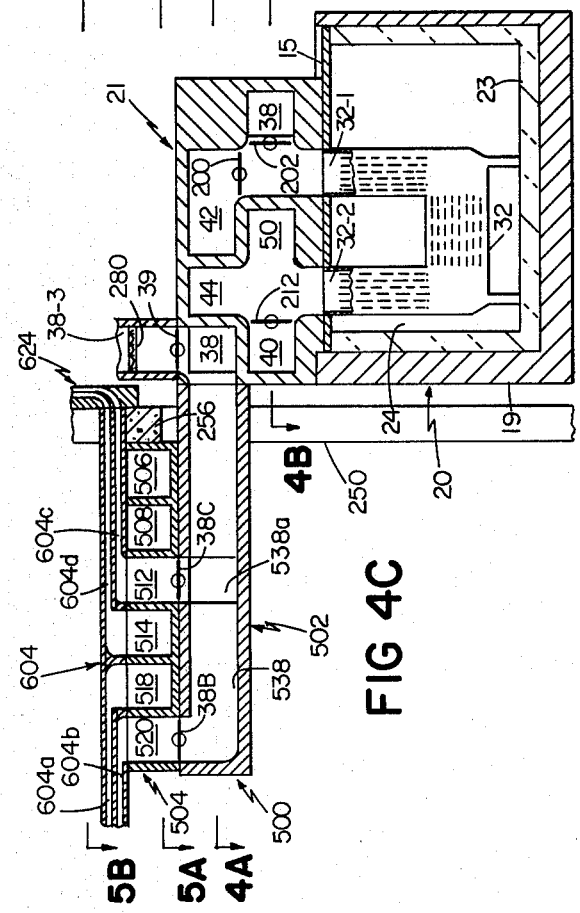
Figure 4F:
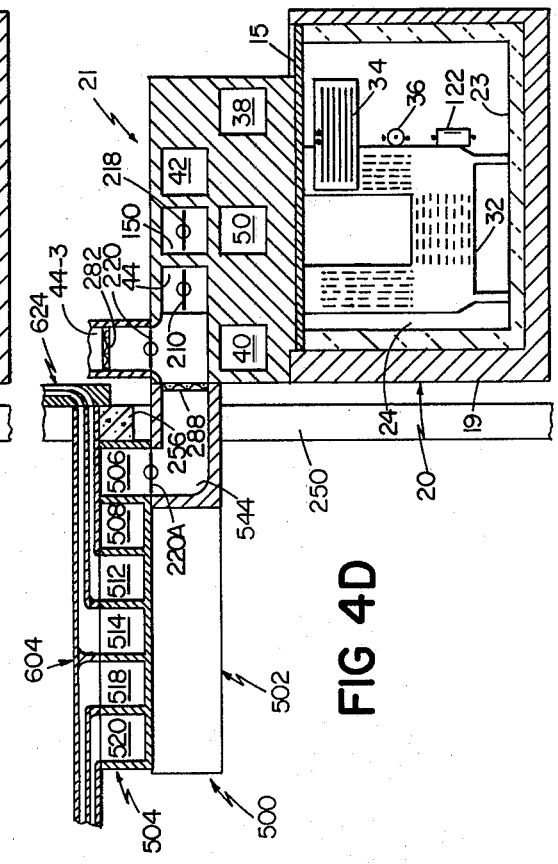

The block construction of air handler 21 and manner in which the dampers fit between the blocks is most clearly shown in FIG. 4G. In FIGS. 4A-F and I, and 5A-B, the dampers are shown somewhat schematically and, for clarity, do not extend all the way across the ducts. In practice, the dampers span the full width of the ducts and are fitted between the blocks forming the air handler. The blocks themselves are tightly fitted together with their adjacent flat sides in face-to-face engagement, and are held together by frame 27. When, as in the case of dampers 307 and 214 shown in FIG. 4B, a damper must fit between a pair of adjacent blocks, one of the pair of blocks is cut away, the portion removed being in thickness equal to that of the damper, so that the damper will fit snugly between the two blocks without upsetting the basic block matrix. The sides of the frame of the damper thus are tightly held in place by the adjacent blocks. As shown, only one of the two blocks on either side of the damper are cut away. If desired, smaller portions may obviously be removed from both. The variable spaced blowers 52, 54 are similarly mounted. Since the blocks of air handler 21 are not physically attached to each other, the air handler may easily be disassembled as required to, for example, repair or replace a damper or blower.

Filters 280, 282, 284, 286 are mounted in, respectively, the inlets to ducts 38-3, 44-3, 40-2, and 42-3. The inlets to each of ducts 38-3, 44-3, 40-2, and 42-3 are in a patio 6 on the east side of residence 18 (see FIG. 1). A filter 288 is also connected in the inlet to duct 42. To reduce pressure losses, all filters in which there may be two-way airflow are rotatably mounted and may be opened when there is exhaust, rather than inlet, flow through the ducts. The construction of the filter assemblies is esentially the same as that of the dampers, except that a removable filter replaces the damper blade 820 shown in FIG. 28.

As shown in FIG. 4A, the four principal ducts of air handler 21, i.e., ducts 38, 40, 42 and 44, are connected to the four generally rectangular in cross-section ducts, designated 538-544, comprising the lower level 502 of air distributor 500. Each of ducts 538-534 is connected to one of the four principal air handler ducts. The upper level 504 of air distributor 504 (see FIG. 5A) includes eight generally rectangular in cross-section ducts, designated 506-520, arranged in six rows and aligned at right angles to ducts 538-544. Each of ducts 538 and 540 includes a short connecting box, designated 538-a and 540-a respectively, projecting to one side of the principal run of the respective duct to make it possible to independently connect each of collectors 10, 11, 12 to the air handler 21 and storage system 20. Thus, one end of duct 538 is connected to air handler duct 38, and the top of duct 538 includes three ports (two in the main run of the duct and one in box 538-a) each of which provides for flow to the air handler from the outlet of one of collectors 10, 11, 12. Similarly, ports in the top of duct 540 provide for the independent connection of the respective inlets of the three collectors to air handler 42. Ducts 542 and 544 connect respectively, air handler residence duct 42 to distributor upper level duct 508 (which in turn provides flow to outlet vents in the rooms of residence 18), and air handler return duct 42 and distributor upper level duct 506 (which in turn is connected to flow from the residence room return vents).

The eight ducts (506, 508, 510, 512, 514, 516, 518, 520) of distributor upper level 504 provide direct connection between the four ducts in lower level 502 and the ductwork within residence 18. Ports are cut into the bottom of the upper level ducts permitting air to flow into them from lower level 502; and, as discussed in more detail hereafter, similar ports are provided in the plank beams forming the residence floor to permit flow from the air distributor into the plank beams. To control these air flows, motorized dampers 38A, 38B, 38C, 40A, 40B, 40C, 207A, 220A are positioned horizontally in respective ports between the two levels 502, 504 of air distributor 500. As shown in FIGS. 4C-4F, 4I and 5A, dampers 38A, 38B and 38C control flow between lower level duct 538 and respectively, upper level ducts 510, 520, and 512; dampers 40A, 40B and 40C control flow between lower level duct 540 and upper level ducts 516, 514, and 518; damper 207A controls flow between ducts 542 and 508; and flow between ducts 544 and 506 is controlled by damper 220A. Distributor upper level ducts 504 are a non load bearing permanent part of the building, typically made of a lightweight insulating material such as cellular plastic. Lower level ducts 502 are of similar material but are removable to provide access to the dampers sandwiched above them.

Figure 6:
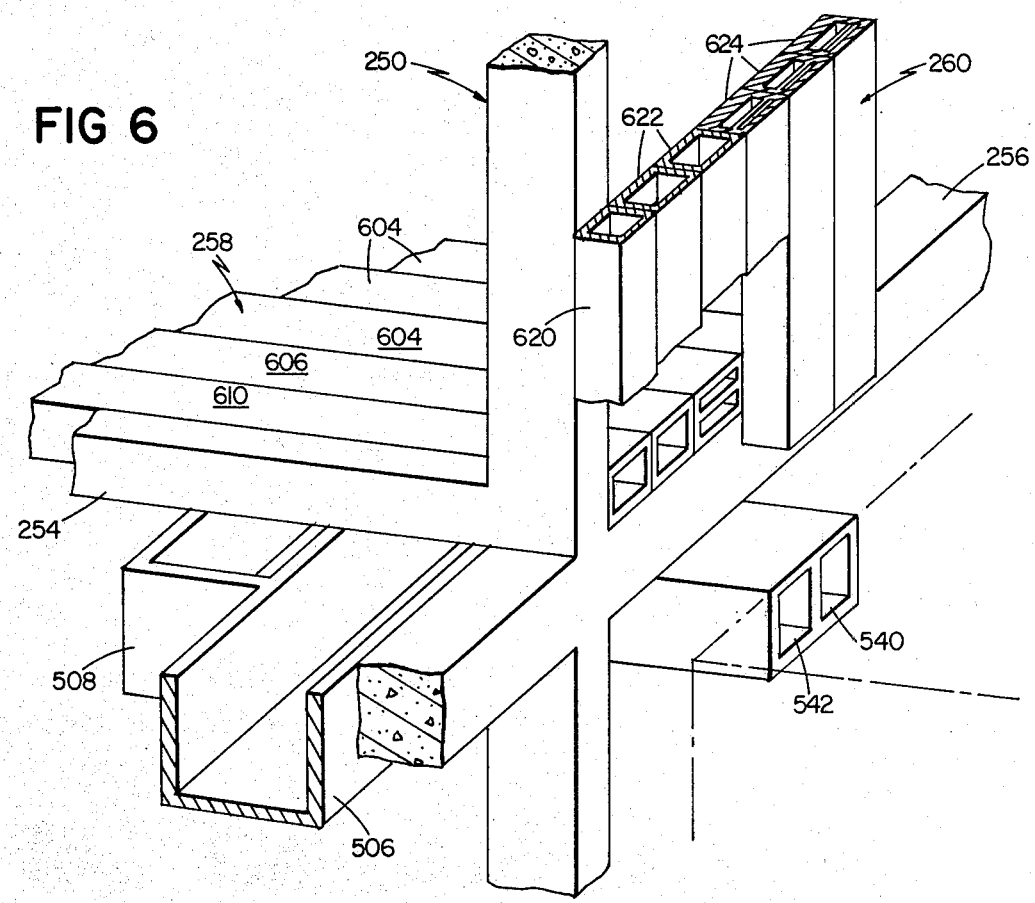
FIG. 6 is a perspective view, partially in section, of a corner portion of the residence of FIG. 1.

Referring now to FIG. 6 residence 18 is constructed with a reinforced concrete frame, including both vertical posts 250 and horizontal cross beams 254, 256, and supports the floors 258 and walls 260 (only one of each being shown in FIG. 6) typically of prestressed extruded concrete and cellular glass respectively. As shown, the relatively perpendicular cross beams 254, 256 intersect post 250 at different levels, the top of beam 256 being in the same plane as the bottom of beam 254. The plank beams forming floor 258 rest on the lower cross beam 256, with their tops coplanar with the top of higher cross beam 254. The upper level 504 of ducts (including ducts 506-520) of air distributor 500 abuts the underside of th floor plank beams. The slabs forming wall 260 are aligned with and abut the ends of the floor plank beams. As discussed hereafter, the wall slabs and roof and floor plank beams provide all the ducting required for air flow between air distributor 500 and the collectors and residence interior. No extra metal ducting or the like is necessary.

Referring now to FIGS. 4C through 4I, 5B and 6, the plank beam forming floor 258 are of at least three different types. Some beams, such as those designated 602, are simply supports and do not act as ducts. Others provide either a single duct or multiple ducts. Thus, plnk beams 604, which as discussed in more detail hereafter provide for flow to and from wall collectors 11, 12, each include both an upper duct and a lower duct, and both the upper and lower ducts are divided vertically intermediate their length to provide for flow, in opposite directions, to or from both west wall collector 12 and east wall collector 11. The two ducts in each beam 604 providing flow to and from the collector 12 in residence west wall 10 are designated 604-a, and 604-b, and connect wall collector 12 to respectively, distribution ducts 518 and 520; while the two ducts extending in the other direction, ducts 604-c and 604-d, connect east wall collector 11 to ducts 512 and 514.

Floor plank beams 606 and 608 each include a single duct and connect roof collector 10 to, respectively, distributor ducts 516 and 510; while floor plank beams 610 and 612 are single duct beams connected to, respectively, residence distribution ducts 506 and 508 and provide for flow to and from the rooms in residence 10.

Typically, all of the floor plank beams are of reinforced extruded concrete, have the same overall height (and usually width also), and have curved edges that uniformly interlock together and distribute weight from one beam to others, similar to the curved and interlocked edges of wall slabs shown in FIGS. 7 and 8. The size of the open duct or ducts extending through a respective beam depends on the particular die used in extruding the beam and can be varied as desired, preferably to insure that pressure drop throughout the residence and distributing system is uniform. To provide ports for connection to the ducts of air distributor 500 and to vertical ducts, holes are sawed out of the center of the top and bottom of otherwise finished plank beams, but the edges of the beams, which carry the heavy reinforcing steel are left intact. After the beams are laid in place to form floor 258, a skim coat of concrete, designated 658 in FIG. 9, is placed on top, the skim coat including wire reinforcement as necessary.

In a similar manner, the curtain wall slabs forming the residence walls are of uniform thickness, exterior appearance and (generally) thickness, but like the floor plank slabs are of varying internal construction and serve several different functions. Some, such as slabs 620, are conventional hollow extruded concrete slabs and simply form part of the outside wall. Others, such as slabs 622, may have the same construction as slab 620 (or, preferably, may be of somewhat different construction as discussed hereafter), but serve also as ducts to carry air to or from the residence rooms or the roof collectors. A third type of wall slab, designated 624, both supports the sections of the wall collectors and provides flow to and through them.

The preferred construction of slabs 622 and 624 is shown most clearly in FIGS. 7 and 8. As there shown, each slab is generally rectangular in transverse cross-section and defines a rectangular interior duct 626 lined with aluminum foil 628. The overall dimensions of slabs 622 and 624 (and also slab 620) are identical. However, the duct 626 of slab 624 is smaller than that of slab 622, and slab 624 includes a wall collector section, generally designated 626, attached to the outer surface of the main body 638 of the slab. The sides 630, 632 of the slabs are undulating, with the opposite sides being complementary so that, as shown, the adjacent slabs will interlock together. The joint 634 between the adjacent slabs is sealed with a water- and vapor-proof flexible adhesive or sealant.

Since they define the exterior curtain walls of residence 18, slabs 620, 622 and 624 should provide all the normally desired construction features, such as adequate tensile strength coupled with lightweight and ease of attachment to the building frame, and should be impervious to water and water vapor, fire resistant, and have long-life and good weather resistance. It is also desirable that their interior surfaces be suitable for application of plaster or any other desired interior wall finishing material. In addition, slabs should also be good thermal insulators and provide for quiet air flow through ducts with minimal air flow resistance to pressure drop.

In preferred embodiments, these attributes are provided by constructing the slabs of a light-weight structural material having good insulating properties, such as cellular glass or plastic, mortar or perlite, or extruded low density concrete. Generally, the slab structure will be reinforced to insure the desired tensile strength and a thin layer (designated 623 in FIG. 7) of high density cellular glass or concrete will be provided on the side of the slab which will define the exterior surface of the residence. Lining interior duct 626 with aluminum foil or the like increases the insulating capacity of the ductwork, increases laminar flow in the duct and eliminates many potential problems of erosion.

If not attached to the building frame solely by an adhesive, slabs 620, 622 and 624 may be supported by brackets, generally designated 640, extending from within the slab and attached to the building frame, including scabbard 642 molded or laminated into the slab with its open end flush with the slab's inner surface 644, and blade 646 fitted within scabbard 642 and attached to the residence or building frame. As shown in FIGS. 8 and 8A, the outer surface of scabbard 642 is serrated so that it will engage the reinforcing mesh 650 in slabs 620, 622, 624. Blade 646 fits within the scabbard and the portion of the blade projecting behind the wall slab rests on, and is embedded in place on the plank beam forming floor 258. The hole in the handle of blade 646 may be used to peg the slab to supporting structures. (See FIG. 9)

The slabs illustrated in FIG. 8 are constructed of cellular glass. Since cellular glass is most economically made in thin layers not over about 2 inches thick, and portions of the slabs are over 2 in. thick, several portions of the slabs comprise multiple layers of cellular glass sheets joined together in face-to-face engagement by an adhesive, such as asphalt. Generally, reinforcement mesh 650 is inserted in the joint. As shown, the sides a of slabs 622 and 624 and the inside portion b of slab 622 each include two glass layers; while the thicker interior portion c of slab 624 includes three.

The outer portion d of the slab 622 is a single layer of cellular glass. To minimize overall weight and for economy of material, while at the same time providing the desired hard exterior, this glass slab is of non-uniform density. The inner 80 percent or so is low density cellular glass; while the outer 20 percent, which forms part of the outer walls of the residence and comprises outer part 623, is high density. As shown, the outer portion d of slab 622 spans the entire width of the slab and the two side portions a each extend from the back of the outer portion to the inside surface of the slab.

As previously indicated, collector section 636 is attached to the outer surface of the body 638 of slab 624. To provide for additional support for the wall collector section, the cellular glass sides of portion a of the beam extend all the way forward to, and are adhesively attached to, the rear of collector section 636.

Slabs 622, 624 may also be made, for example, of cellular polystyrene in which case a thin layer of concrete (to provide hard outer layer 623) will be generally attached to the outer surface of the polystyrene body of slab 622, while collector section 626 will be attached to the outer surface of the polystyrene body of slab. Such polystyrene slabs may be fabricated of layers attached together with adhesive, as with the cellular glass embodiment, or may be molded or extruded with reinforcement, as with concrete.

Collector section 636, like the wall collector described in previously mentioned application Ser. No. 927,048, comprises a vertical air passage 100 between a prefabricated concrete slab 102 forming the exterior wall of the building and an interior concrete slab 104 adhesively attached to the exterior surface of the cellular glass layers defining the outside of the body 638 of beam 624. Aluminum screen mesh 105 is embedded in slab 102, parallel to and about 1 mm. from the exterior surface of the slab. Generally rectangular in transverse cross-section, expanded aluminum fins 106 are embedded in and extend between slabs 102 and 104, with the outside edges of the fins engaging mesh 105. The expanded metal configuration of fins 106 is shown in FIGS. 9 and 11. As will be evident, fins 106 have a high thermal conductivity and resistance to corrosion and provide a large surface area for heat transfer with the air flowing through passage 100. The expanded metal configuration creates turbulence with the air, further improving thermal conductivity, and also provides the flexibility desired to adapt to varying conditions of thermal expansion and to manipulation during construction and installation. In some embodiments, slabs 102 and 104 may be cellular glass rather than concrete, in which case fins 106 should be iron rather than aluminum since temperatures in excess of the melting point of aluminum are required to bake and cure the cellular glass. With concrete slabs, it may be desirable to mix a selective coating material, such as lead oxide, with the mortar used in making the slabs to insure the absorbtivity while simultaneously reducing emissivity.

Reference is now made to FIGS. 9 and 10 which illustrate the connection of curtain wall slabs 624 to the frame of residence 18, and the connection of ducts 626 and 100 in curtain wall slabs 624 to, respectively, ducts 604-d and 604-c of floor plank beam 604. The portion of the body 638 of slab 624 overlying the end of floor plank beam 604, together with the corresponding section of inner divider 104 and fins 106 of collector section 636 are removed. A molded plastic air flow elbow section, generally designated 650, is fitted in the resulting cavity 652 with the inner surface of elbow section 650 abutting the end of beam 604 and its outer surface abutting the inside of collector slab 102. As shown in FIG. 10, cavity 652 does not extend the full width of slab 624, and leaves intact the edge portion of the slab carrying scabbards 642. Within elbow section 650 are two curved ducts, designated 654 and 656. Duct 654 extends to and provides smooth air flow between wall slab duct 626 and floor plank beam duct 604-d; duct 656 similarly connects collector flow passage 100 and floor beam duct 604-c.

The blades 646 supporting wall slabs 624 are embedded in concrete layers 658, 660 cast, respectively, on top of the floor beam 604 and around frame cross beam 256. Finishing plaster or other finish material layers 661 above concrete layer 658 and inside slab 624 define the floor and interior wall of the adjacent room of residence 18.

A control damper, generally designated 101 in FIGS. 11 and 11A, is mounted in a recess 670 at the top of each beam 624 to control air flow into and through collector air passage 100. As shown, each damper 101 includes a control blade 672 that is rotatably movable (on rotary shaft 673) between two positions, position A (illustrated) and position B (indicated in dashed lines). In position A, damper blade 672 permits outside air to flow through inlet port 674 into collector air passage 100; in position B, the damper blade closes off inlet port 674 and flow into collector passage 100 is from beam duct 626. Both the casing 676 and blade 672 of damper 100 are of molded organic plastic. A slot 678 at inlet port 624 is arranged to receive an air filter 680 and mount it in position over port 674. A motor 669 drives shaft 673 and damper blade 672 through a series of step-down gears 671 and limit switches 675 responsive to a finger 677 mounted on shaft 673 control the extent of rotation. The entire damper assembly may be removed as a unit for repair or replacement. Flexible seals 680-A surrounding the inlet into duct 626 and case 676 near the mouth of recess 670 minimize infiltration of air.

Reference is now made to FIGS. 12-18 which illustrate the roof collector and its connection to the rest of residence 18 and the solar systems. As shown, the roof 14 is made of hollow extruded concrete plank beams 60 extending the width of the roof and supporting the roof collector 10, which comprises roof tiles 62 (from the outside visually conventional) spaced from the upper surface of beams 60 to provide air passages 64 between tiles and beams. Expanded aluminum fins 66 are embedded in and project downwardly from tiles 62 with their outer edges generally parallel to and close to the outer surface 82 of the tiles and their inner edges abutting the upper surface of beams 60 or insulating material on top of such beams. Fins 66 are about 1 mm. thick and both help to support tiles 62 and to divide air passage 64 into a number of smaller flow passages.

Beams 60 are hollow. The hollow centers of the two beams, designated 60-1 and 60-2, at, respectively, the upper and lower ends of collector 10 provide longitudinally extending air ducts 61-1 and 61-2. Ports 70, 72 in the tops of, respectively, beams 60-1 and 60-2 provide for air flow between the duct 61 of the particular beam and the collector. Each of ports 70, 72 extends longitudinally of the respective beam 60 a distance slightly less than the width of a tile 62, leaving a web 71 between adjacent ports.

Figure 13:
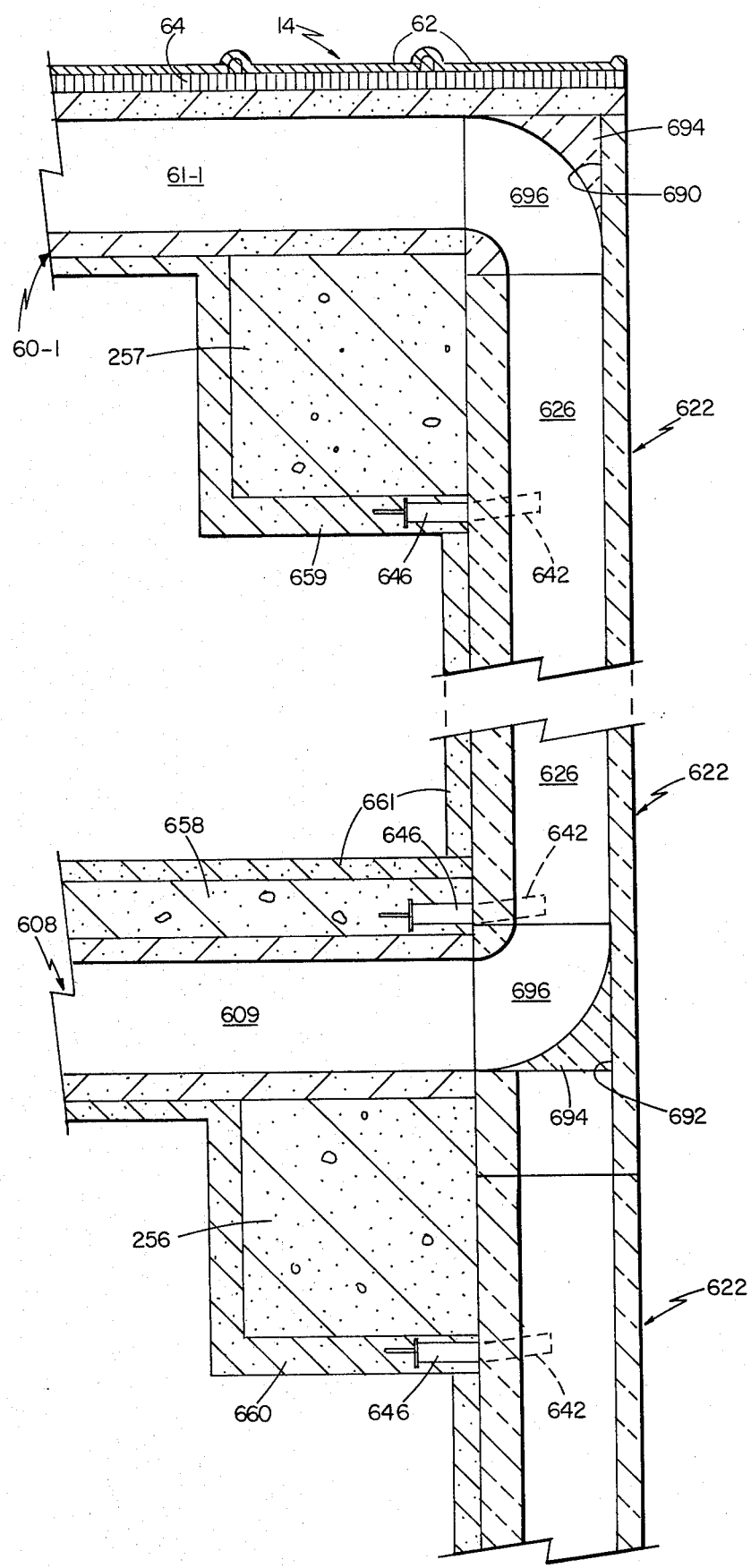

Referring to FIG. 13, a curtain wall slab 622 overlies the ends of both roof beam 60-1 and the floor plank beam 608 connected (through a port in its bottom) to air distributor duct 510 (see FIGS. 4H, 5A and 5B). The portions of the wall slab overlying the ends of the roof and floor beam are removed to provide recesses, designated 690, 692 respectively, into which are fitted air flow elbows 694. Each recess 690, 692 extends from the inner surface of slab 622 to the outside of slab duct 626 and has a width the same as that of duct 626. Each elbow section 694 defines a curving air passage 696 providing a smooth flow and transition between wall slab duct 626 and the roof and floor ducts 61-1 and 609. Vanes may be added at the elbows 696, as well as other elbows in the system, to further ease airflow and reduce the pressure drop and power used by the blower. Vanes may also be placed in ducts of air distributor 504 to properly divide and regulate air flow through the ports to the ducts in plank beams 604, 606, 610, etc. The blades 646 assisting in mounting wall slab 622 in position are, as in the case of wall slab 624 discussed previously, embedded in skim concrete layer 658 above floor 258. At the top of slab 622, a third blade 646 is similarly embedded in concrete 659 surrounding building frame upper cross beam 257.

In a similar manner, duct 61-2 of roof beam 60-2 is connected to the interior duct 607 of floor plank beam 606, which itself communicates with air distributor ducts 516 and 540a (see FIGS. 4F and 5B) through another wall slab 622. At floor 258, the construction providing the connection is substantially identical to that shown in FIG. 13. The roof-wall connector, however, is somewhat different. As shown in FIG. 14, a damper assembly 700 fits into a recess 701 at the junction of wall slab 622 and roof beam 60-2 and controls flow into roof beam duct 61-2. The damper assembly 700 comprises a vertically movable closure 702 mounted for movement, in response to rotation of screw 704 between the position shown and that indicated by dashed lines. In the position shown, closure 702 permits air to flow into beam duct 61-2 from the outside, through port 706 in wall 16, and closes the upper end of wall slab duct 626. An air filter 708, angled downwardly and held in position by a rain cover 709, is mounted in port 706. In the position indicated by dashed lines, closure 702 closes port 706 and permits air flow from wall slab duct 626 to beam duct 61-2, and then to the roof collector 10. A motor and gear assembly 710, mounted in a cut-out in the end of beam 61-2, drives screw 704 to move closure 702 between the two positions. As shown, closure 702 comprises a pair of relatively perpendicular top and back plates 712, 714 and two air flow directors 715, 716, all extending the full width of the ducts in wall slab 622 and roof beam 60-2, between spaced parallel side plate 719 engaging opposite sides of the damper assembly. Back plate 714 has a vertical height slightly greater than that of port 706; top plate 712 has a horizontal length greater than that of duct 626. Air flow director is a molded cellular plastic block mounted in the angle between plates 712, 714, and has a curved inner surface 717, for providing smooth air flow from duct 626 to duct 61-2 when the closure is in the dashed line position. Air flow director 715 is a curved plate, mounted coaxially with and of smaller radius than the radius of curved surface 717, and extends between parallel spaced side plates 719. The bottom of air filter 708 is fitted in a channel adjacent wall 16 and the top of the filter fits in a similar channel at the outer end of rain cover 709. As shown, the entire damper assembly may be inserted into, and removed from, the recess 701 as a unit.

FIG. 15 illustrates a modified damper construction 720 that may be used, in lieu of damper assembly 700, for controlling air flow to roof beam duct 61-2. As shown the top of wall slab 622 and the end of roof beam 60-2 are removed, and a short chimney 722 is mounted in the resulting cavity 724 on top of wall slab 622 and abutting the end of roof beam 60-2. The chimney extends above roof tiles 62 and at its top is fitted with a chimney cap 726 (of conventional tiles 621) overhanging all four chimney sides. A flange 728 extends down from the bottom of cap 726 to just below the top of chimney 722 and forms a port 730, in the scape of a square annulus, between the chimney and flange. Air filters 732 are fitted in position in the port. The duct 61-2 of roof beam 60-2 abuts a port 734 in the side of chimney 722, and a damper and flow control 736 is mounted in the chimney, adjacent port 734, for rotation on its mounting shaft 738 between the position shown, in which it permits air flow from wall slab duct 626 to roof duct 61-2 and prevents flow to the roof duct from outside air port 730; and the position indicated in dashed lines, in which it closes off the top of wall slab duct 626 and permits flow of outside air into roof duct 61-2. The shaft 738 on which flow control 736 is mounted is motor driven, and the extent of movement controlled by limit switches, in the conventional manner. As shown, the flow control 736 includes a pair of spaced parallel side plates 740, engaging opposite sides of chimney 722, and three curved blades extending between the side plates. The largest curved blade 742 both seals off the flow, from either duct 626 or port 730, and provides for smooth flow of air around the 90° bend into roof duct 61-2. The other two blades, 744 and 746, are mounted coaxial with but are of lesser radius than blade 742, and simply aid in guiding air smoothly around the bend, thus reducing resistance to air flow and electrical power used.

Figure 16:
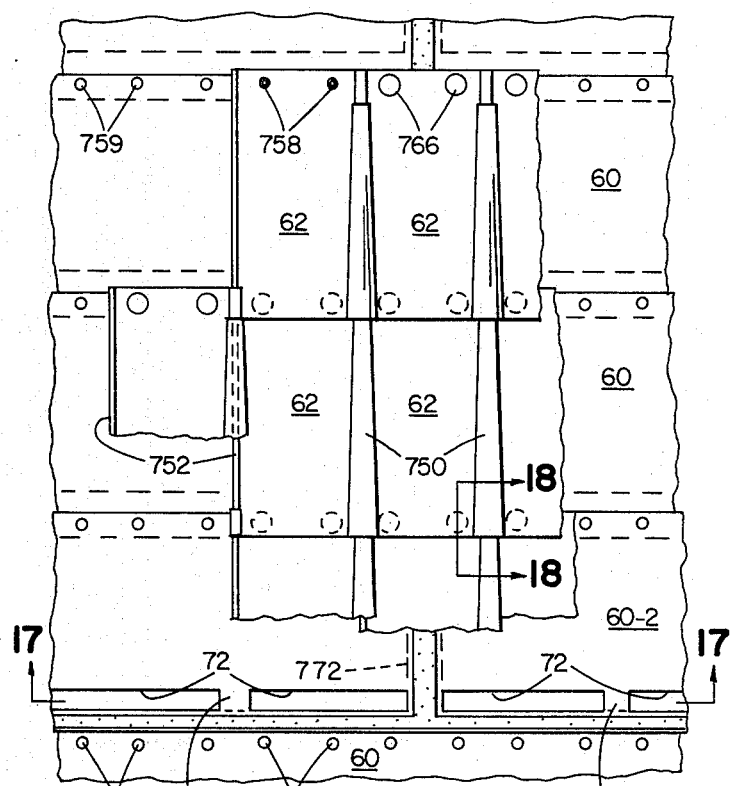
FIG. 16 is a plan view of a portion of the roof of the residence of FIG. 1.
Figure 18:
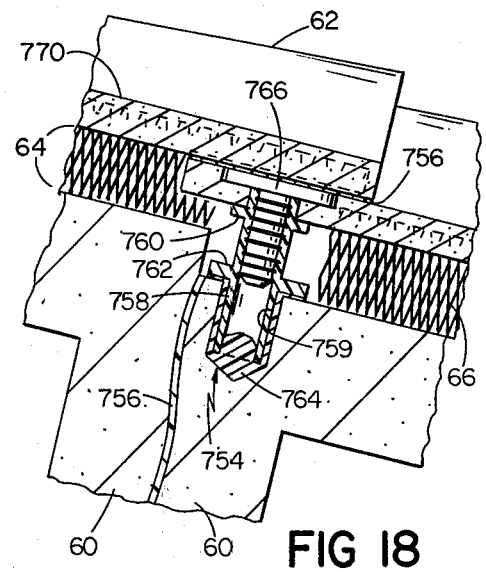
FIGS. 17 and 18 are sectional views taken respectively at lines 17—17 an 18—18 of FIG. 16.
Figure 17:
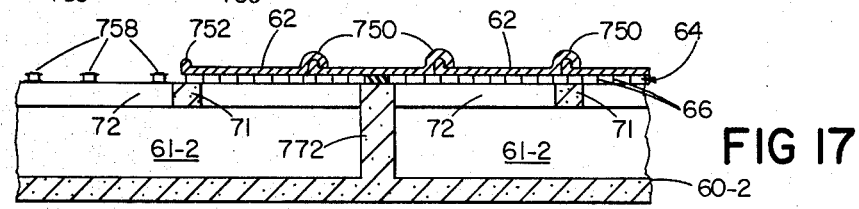

The construction of roof tiles 62 and the manner in which they are connected to each other and to roof beams 60 is shown most clearly in FIGS. 12 and 16–18. As in conventional tile roofs, the sides and ends of the tiles 62 overlap. Along the sides, one edge of each tile includes an overlapping semi-cylinder 750 designed to receive an upwardly projecting ridge 752 along the opposite edge of the adjacent tile (FIG. 17). The ends of the tiles are rabbeted. The downhill end of the tile forms the upper layer of the joint and is undercut to receive the uphill end of the underlying tile (FIG. 18). The connector assembly, generally designated 754 that connects the uphill end of the underlying tile to the roof is within the rabbeted joint; and sealant 756 is laid both in the rabbeted joint between the tiles and the vertical butt joint between adjacent roof beams 60.

Connector assembly 754 includes a hollow, generally cylindrical plastic spacer 758, one end of which fits into a drilled hole 759 in the top of a beam 60 and the other end of which is received in a molded hole in the underlying tile 62. The distance the spacer fits into each hole, and thus the distance between the underside of tile 62 and the top of beam 60, is determined by radially projecting flanges 760 and 762, the location of which in turn depends on the height of fins 66. Flange 760 engages the underside of and supports tile 62; flange 762 engages the top of beam 60. An adhesive sealant 764 is deposited in hole 759 to hold spacer 758 in place. The underlaying tile 62 is attached to the spacer by a bolt 766 extending through the hole in tile 62 with the bolt head fitted in a counterbore in the top of the tile. The threads of the bolt engage the interior bore of spacer 758.

The manner in which fins 66 are embedded in tile 62 is most clearly shown in FIG. 18. In a manner similar to the fins of wall collector 12, each fin 66 engages a heat conducting wire mesh 770 lying close (about 1 mm.) behind the outer surface of the tile, and projects downwardly from the bottom of the tile to rest on the top of beam 60. Unlike the fins of wall collector 12, fins 66 are not embedded in the underlying beam. To prevent tiles from lifting, fins at the lower end of the upper tiles fit around the upper end of the lower tiles as shown in FIG. 18. Several tiles may be fabricated in larger slab units to reduce the work of air sealing and attachment on the construction site.

Figure 12:
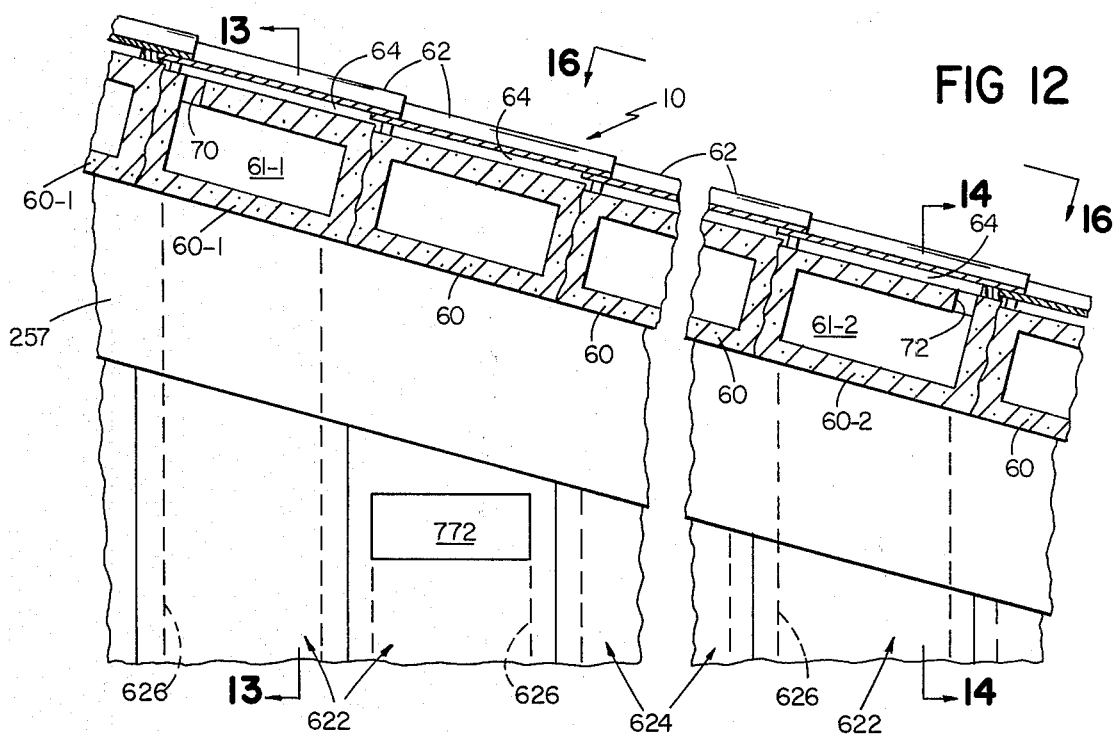

FIGS. 12, 16 and 17 illustrate also the manner in which air flows between beam ducts 61-1 and 61-2 and collector air flow passages 64. As previously indicated, longitudinally spaced beam duct ports 70, 72 are provided along the top surfaces of, respectively, beams 60-1 and 60-2. Ports 70 provide for flow from the roof collector into beam duct 61-1; and ports 72 permit flow from beam duct 61-2 into the collector air passage 64.

Midway the width of roof 14, beam ducts 61-1 and 61-2, and collector air passage 64 are blocked by dividers 772 which divide the beam ducts longitudinally in half. The portions of roof collector 10 to one side of the beam dividers are connected to storage system 20 and air handler 21 by ducts in residence west wall 17; flow to and from the portions of the roof collector on the other side of beams is through the already described ducts in east wall 16. To the extent practicable, the ducting in the two walls is identical.

Air flow from air handler 21 to and from the rooms of residence 18 is also through ducting in the residence floor and walls. Air distributor duct 506 communicates with ports in a number of floor plank beams 610 (see FIGS. 4K, 5A and 5B), each of which includes a single interior duct 611 communicating with the duct 626 of a wall slab 622 (in either east wall 16 or west wall 18) and/or an interior hollow post 770. Similarly, air distributor duct 508 communicates with ports in floor plank beam 612 (see FIGS. 4I and 5B) which also provides flow to selected wall slabs 622 and interior posts 771. Ports in the sides of the wall slabs and interior posts, for example slab port 772 shown in FIG. 15 and post ports 773, permit flow directly into or from the residence rooms. The post and ceiling ports connected through floor plank beams 612 to ducts 542 and 42 are near the room ceiling; those connected through floor plank beam 610 to ducts 544 and 44 are near the room floors. The interconnection between the floor and wall beams of the residence room distribution system is substantially as already shown in FIG. 12 and discussed with reference to the roof collector flow system.

Referring now to FIGS. 19–24, heat pump module 25 includes a matrix 400 of thermally insulating material (such as polystyrene), generally L-shaped in horizontal cross-section and both supporting the condensers, compressors, evaporators, etc. of the heat pump module and enclosing most of the associated wiring, tubes, valves and the like. Matrix 400 is mounted in concrete tank with the junction 402 of the two legs 404, 406 within hot water tank 26 and the two legs projecting through respective vertical slots in the tank walls into, respectively, cold tank 24 and heat tank 22. Evaporator 30 and condensor 31 are mounted on leg 406 in heat tank 22; evaporator 34, compressor 36 and accumulator 122 on leg 404 in cold tank 24; and condeser 126 and motor 120 in hot water tank 26. The shaft 121 of motor 120 extends through the matrix to compressor 36. Control valves 228, 230 and 224, and combination expansion/control valve 124 are mounted within the matrix. Each of the valves acts as a directional valve, controlling flow to or from the condensor or evaporator to which it is connected. The connection of these valves and the particular flow each controls are evident from FIG. 21, and are discussed in somewhat more detail in the aforementioned application Ser. No. 927,048. In the present application, combination expansion/control valve 124 serves the purposes of both expansion valve 124 and control valve 226 of the aforesaid application.

Each of condensers 31 and 126 and evaporators 30 and 34 comprises closely spaced parallel plates connected to common inlet and outlet headers. Each plate comprises two sheets of copper or, preferably, aluminum selectively bonded together and the unbonded areas then expanded to provide the desired overall configuration and interior spaces. Typically, the plates are made using the conventional Roll-Bond process of Olin Brass Co. of E. Alton, Illinois. In FIGS. 22 and 23, which are sectional views of portions of a single plate of expander 30 and condenser 31, respectively, the bonded-together portions of the two sheets forming the plates are sectioned.

In evaporators 30 and 34, it is desirable that there be maximum contact between the liquid within the evaporator and the exterior walls of the evaporator plates, which of course contact water within the heat or cold tanks. Each evaporator plate, thus, includes horizontal troughs vertically spaced above the bottom of the plate. The top and alternate troughs designated 410, are connected at one end to inlet side 412 of the plates and have lips 414 at their other end, nearest the outlet side 416 of the plate, extending upwardly slightly more than half the distance to the bottom of the above one of the other troughs 411. Substantially, identical lips 415 are provided at the end of each trough 411 closest to inlet side 412. At its other end, closest to outlet side 416, each trough 411 has a slightly higher lip 417, extending upwardly past, and spaced from the adjacent end of, the above-one of trough 410. The space 418 between the left (as seen in FIG. 22) end of troughs 411 and the inner side of the plate defines a vertical vapor flow passage.

Liquid is introduced into the evaporator plate through a tube from inlet header 420, initially filling the top trough and then, as controlled by the trough lips, overflowing into and filling the troughs below. Vapor exits through exhaust header 422. Because the exhaust header is connected to the top of the evaporator plates, the danger of liquid being drawn into compresser 36 is substantially eliminated.

In condensers 31, 126, the object is to provide maximum total surface exposed to vapor, but at the same time the vertical height of any particular wall should be limited so that there will be minimum build-up of surface films, which act as thermal insulators. Accordingly, each condensor plate defines vertically-spaced chambers 430, each extending substantially the full width of the plate at a slight upward angle from an entrance mouth at one side 436 of the plate and communicating with a vertical passage 434. Vapor is introduced into vertical passage 434 through tube 437 from inlet header 438 and fills the condensor chambers 430, in which the liquid is then condensed. The condensate flows down the short vertical walls and then down the sloping floors of the chambers into vertical 438 passage, and then runs into the exhaust header 440 at the base of passage.

In both the condensors and evaporators, the four tubes of the inlet and exhaust headers are individually connected to the individual plates, and the actual plate-to-header connection is made vapor tight using an anaerobic refrigerant adhesive of the type manufactured and sold by Loc-Tite Corporation.

Figure 19:
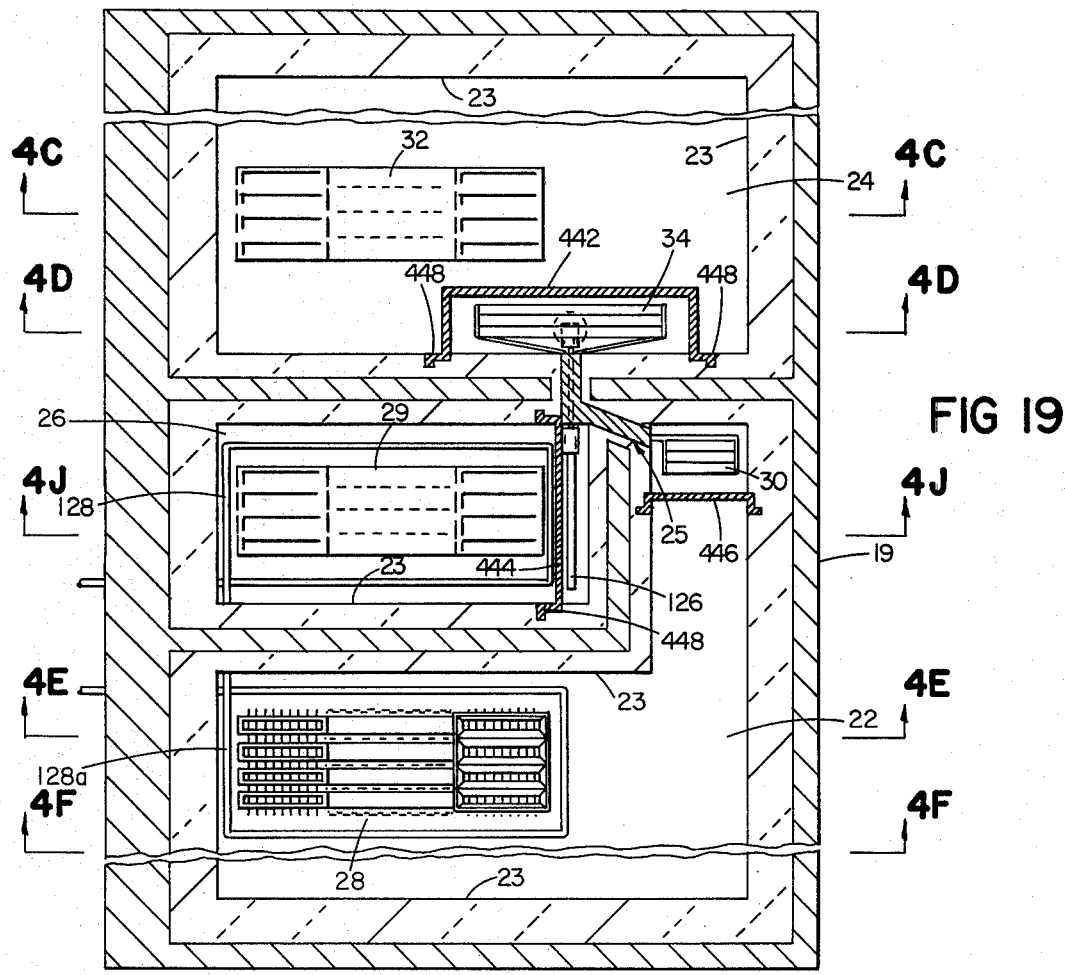
FIG. 19 is a sectional view of portions of the storage system.

The overall weight of heat pump module 25 is slightly more than that of the water it displaces. The entire module is designed to be removed from the concrete storage tank 19 as required for maintenance and replacement. When the module is so removed, it is important to prevent significant water flow between the three tanks. Accordingly, as shown in FIG. 19, baffles may be inserted in place in each of the three tanks, surrounding the portion of the heat pump module in that tank, prior to removal. Each baffle, designated 442, 444 and 446, has an overall height greater than the depth of water in the respective cold, hot water or heat tank and extends upwardly from a slot in the floor of the tank. The sides of the baffles fit in the tank walls. Each slot, both in the tank walls and floor, includes a strip 448 of resilient sealing material along one side thereof, to insure a tight fit with the respective baffle. As shown, the baffles 446 and 444 in heat tank 22 and hot water tank 26 are simply flat plates; baffle 442 in cold tank 24 is "U" or channel shaped in horizontal cross section. The baffles are, of course, removed when the system is in operation.

Figure 25:
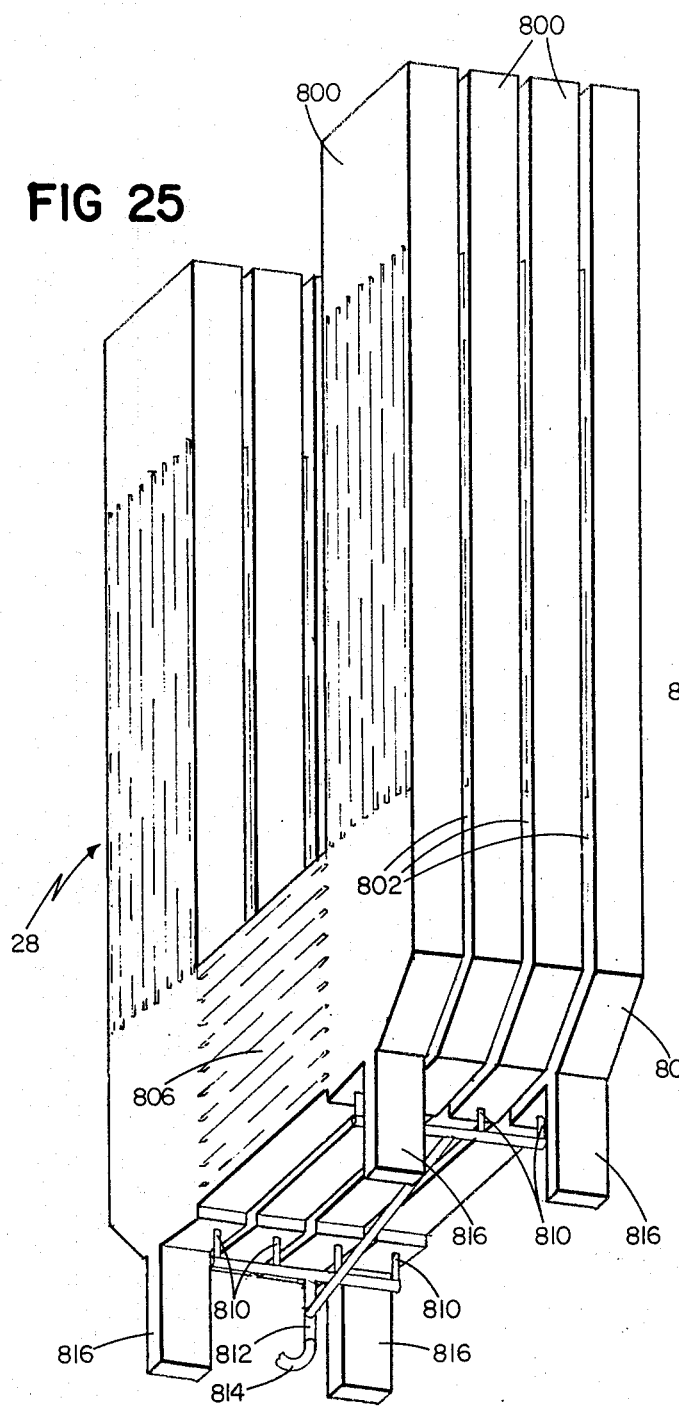
FIG. 25 is a perspective view of the heat exchanger.
Figure 26:
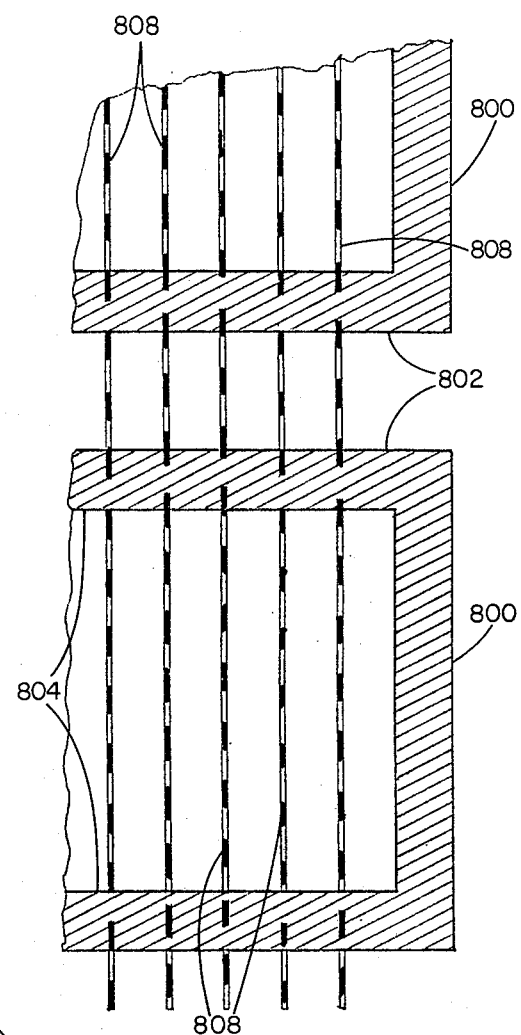
FIGS. 26 and 27 are sectional views of portions of the heat exchanger of FIG. 25.
Figure 27:
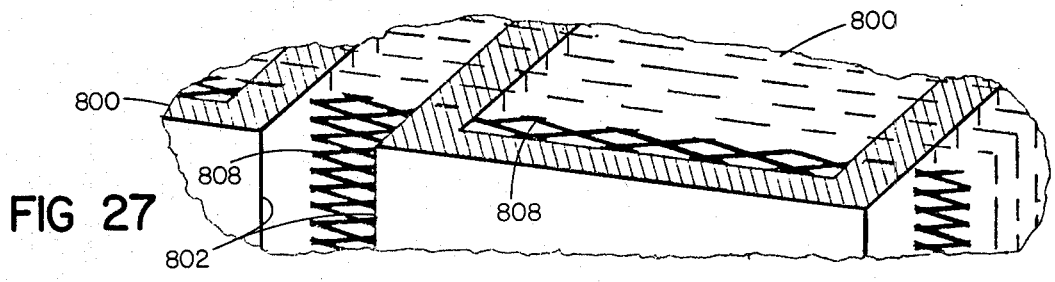

Reference is now made to FIGS. 25 through 27 which illustrate the construction of heat exchanger 28, which is essentially identical to that of hot water exchanger 29 and cold exchanger 32. As shown, heat exchanger comprises four vertical, hollow U-shaped sections 800, spaced apart from each other. The gap 802 between adjacent sections 800 is about 2 centimeters. Each section is of concrete or molded plastic and includes a generally rectangular interior duct 804 providing for air flow down one vertical leg of the section, through the horizontal connector 806 between and connecting the two legs, and then up the other vertical leg. A plurality of expanded metal, typically aluminum, conductors 808 extend transversly through the full width of, and a short distance (about one centimeter) beyond the opposite sides of the heat exchanger. As shown in FIGS. 26 and 27, conductors 808 extend continuously through and are embedded in the side walls of all four sections 800. The conductors in the two vertical legs are vertically oriented, are spaced about one cm. apart, and extend from the top of horizontal connector 806 to a short distance below the top of the vertical legs. In horizontal connector 806, the horizontally oriented conductors 808 are vertically spaced apart, at about one cm. intervals from the bottom to the top of the duct within connector 806.

A drain tube 810 is connected to the bottom of each leg of each section 800 to carry off consensate; and the main drain 812 to which all tubes 801 lead is attached to a flexible drainage hose 814. The drainage hose of each heat exchanger is led off through the wall of tank 19 of storage system 20. To provide space for the drains and convection of water, the entire heat exchanger is supported above the floor of tank 19 by legs 816. In cases when water circulation by convection may be inadequate, such as a cold tank at four degrees centigrade, a small pump may be placed in the tank below the exchanger and operated when necessary.

The heat exchanger design maximizes air-to-metal heat transfer area by use of expanded metal, and maximizes exchanger size, permitting reduced air speed, lower pressure drop, and lower electricity consumption by the blower. The design minimizes the amount of metal used, thus reducing cost.

Heat exchangers are divided into four sections to reduce the temperature drop from portions of the conductors in water to the portions in the heat exchanger air passages, and also to permit use of different sections for different airflow patterns, such as in a multi-zoned building and with a modified air handler.

FIGS. 28-30 illustrate the construction of air handler damper 218, which is substantially identical to the other dampers used in air handler 21 and air distributor 500. As shown, the damper includes a square blade 820 mounted in frame 822 for rotation about its reinforced central axis 824. At its top (as shown in FIG. 28), blade 820 is held in place by a pin 826 extending through a bushing in the frame into the blade. At the bottom of the blade, a pin 828 is press-fitted into a bore in the reinforced axis portion and extends downwardly through frame 822 to engage the drive of a motor assembly, generally designated 850. The inside of frame 822 is lined with a flexible, typically elastomeric, seal 832 to provide a tight seal with the edges of blade 820 when the damper is closed.

Motor assembly includes a reversible d.c. motor 833 driving an output shaft 834 through a step-down gear train 836. The entire assembly is within a substantially air- and dirt-tight plastic housing 838. Output shaft 834 extends through a bearing 840 held by the housing upwardly into the recess 842, defined by housing 838, in which damper frame 822 is seated and held in place by cross-pins 844. As shown in FIG. 29, pin 828 (holding plate 820 in frame 822) and drive shaft 834 are coaxial, and are connected to each other by a bushing 844 within a bore 846 in the bottom of frame 822. To insure proper movement of blade 820, there are press fits between bushing 844 and both shaft 834 and pin 828, and between pin 828 and the blade.

Normally closed switches 860 control motor 832 and, thus, movement of damper blade 820. One switch, 860a, is mounted on motor housing 838 in position to engage a projection 862 on the lower edge of blade 820 when the damper is open, i.e., when blade 820 is at a 90° angle to frame 822 (see FIG. 30); the other switch, 860b, is mounted on the side of frame 822 and is engaged by blade 820 when the damper is closed. Each switch includes a pair of conductors 864, 866 mounted within the interior cavity of 866 of a two-part plastic housing 867 at one end of cavity 865, contacts 864, 866 are spaced apart by an insulating washer 870. An insulating bushing 872 passes through washer 870 and the contacts 864, 866 on either side thereof, and a bolt 876 through bushing 872 attaches the entire switch assembly to the damper frame or motor box. Midway its length, contact 864 is offset to provide a break section 876 in face-to-face engagement with contact 864. Housing 867 is stepped to provide a backing for break section 876. Contact 866 is biased, i.e., sprung towards break section 876 so that the two contacts are normally in electrical contact. For breaking electrical contact, a pin 878 is mounted in an insulating bushing 880 with the head 882 of the pin engaging the free end of contact 866. When pin 878 is pressed, by either projection 862 (in the case of switch 860a) or blade 822 (in the case of switch 860b), contact 866 is opened, breaking its contact with the contact portion 876 of contact 864.

Referring now to FIG. 32, the control circuits 832 includes a d.c. power source 890, a pair of reversing switches 892 in the master control and switches 860. When reversing switches, which always move together, are in the the position shown, power source drives motor 832 to open the damper, and rotates damper blade 820 (counterclockwise as shown) until the blade projection 862 comes into contact with pin 818 of switch 860a, opening the switch. For closing the damper, switches 892 are thrown, and blade 820 then rotates (clockwise as shown) until it contacts and opens switch 860b.

OPERATION

In operation, the above-described system provides many different services, including heating, humidity control (humidification and dehumidification), air conditioning (cooling), fresh air flow, heat collection and dispersal, heat transfer between the various tanks, and heating of domestic hot water, all as described in more detail in my aforesaid prior application. Most of these services may be performed in any one of several ways, as desired to improve overall efficiency; and many may be performed simultaneously.

The unusually low temperatures (for a solar system) of the air used as a heat transfer fluid permits the use of low-cost cellular materials in the ducts, collectors and air handler. The maximum temperature of air in the system, when air from the collectors is used to directly heat the hot water tank, will seldom exceed 65° C. (150° F.). Should the collectors themselves reach a higher stagnation temperature (e.g., a miximum of about 90°-95° C.), cool air may be blown through them in the reverse direction and then out of the respective one of dampers 700, 720 or 101. After cooling, the system will then revert to normal open or closed circuit operation, in which air from the collectors heats liquid in any desired one or more of the tanks.

1. Heating

During the winter heating season, the temperature of the water in the cold tank 24 is typically maintained between 10° C. and 25° C. and, lacking a brine solution in the cold tank and defroster in the cold exchanger, never less than about 3° C. The maximum temperature of the cold tank depends on whether dehumidification is desired, in which event temperatures above about 11° C. are undesirable, and will never exceed the stagnation temperature of the collectors, which typically will range from 20°-70° C. in the winter, and 30°-85° C., or possibly somewhat higher, in the summer according to incident energy.

The water in the cold tank is heated in the winter by air from any selected one(s) of collectors 10, 11, 12. If the temperature of the outside air is greater than that of water in cold tank 24, outside air is drawn into the collectors; when the outside air is colder than the cold tank, air is circulated through the system. In either event, the heated air passes through cold exchanger 32 in cold tank 24, in which tank the air is cooled, and the heat extracted therefrom warms the water in the cold tank.

For heating residence 18, the temperature of the water in heat tank 22 must be above that of the interior of the residence, but if too high will unnecessarily increase the work that must be done by compressor 36. Typically, the water is maintained at about 30°–35° C. (about 85°–95° F.), a temperature sufficient to heat air flowing through heat exchanger 28 to room heating temperature. When the temperature of water in heat tank 22 drops below the appropriate temperature range, heat is transferred to the heat tank from cold tank 24 by heat pump module 25. If however, the outside conditions are such that the temperature of air from the collectors is higher than that of the water in heat tank 22, and especially if the water in the cold tank is at the maximum temperature desired for cooling or dehumidification, air from the collectors may be passed through heat exchanger 28 in heat tank 22, thereby adding heat directly to the heat tank.

The interior of residence 18 itself is heated by air circulated through the heat exchanger 28 in heat tank 22. Blower 54 draws air through selected ducts in the floor plank beams, air distributor and air handler, forces it through the heat exchanger 28 where it is heated, and then back through other air handler, air distribution and plank beam ducts back into the residence rooms. If it is desired to dehumidify the building heating air, some or all of the air flow from the residence, rather than being passed directly into heat exchanger 28, may be directed first through cold exchanger 32 and then into heat exchanger through air handler by-pass duct 50.

By adjusting various dampers as desired, fresh air from the outside can be introduced into air handler 21 and be heated in heat exchanger 28, either with or without dehumidification, and stale air may be expelled directly to the outside.

2. Cooling (Air Conditioning)

During the summer cooling (air conditioning) season, the temperature of cold tank 24 typically is maintained between 10° C. and 15° C. (50°–59° F.), preferably about 11° C. (52° F.); so that the relative humidity of 20° C. (68° F.) air will not exceed about 55 percent. To prevent the temperature of water in the cold tank from becoming too high, excess heat in the cold tank must be dissipated, either through heat tank 22 or, when possible, directly. Normally, heat is removed from the cold tank and deposited in heat tank 22 by activating heat pump module 25, just as during the heating season. When the temperature of the water in the heat tank becomes higher than that of the outside air, it is cooled by circulating air from the outside, e.g., through duct 38-3 through heat exchanger 28 and then back to the atmosphere. Heat in heat tank 22 may also be dissipated by transferring it to hot water tank 26 with heat pump module 25 or using it directly to heat domestic hot water in coil 128a. At night, heat in either the cold or heat tank may be dissipated more directly by passing cold outside air through the collectors and then through the cold or heat exchanger to the outside.

To cool residence 18, blower 54 is reversed; air from the residence rooms is forced through the plank beam ducts, etc. into exchanger 32 where it is cooled and may be dehumidified, and from there, the cool air is returned to the rooms. It also is possible to cool (air condition) while simultaneously collecting heat in the cold tank. To thus collect more heat than otherwise possible, blower 54 draws air from residence 18 and forces it through cross-duct 150 and then through cold-exchanger 32. After being there cooled and transferring heat to the water in the cold tank, the air is returned to the residence 18. At the same time, air from the collectors is forced through cold exchanger 32 by blower 52.

3. Hot Water Heating

During the summer the water in hot water tank 26 normally will be heated by the air from the collectors using a closed circuit air flow pattern through various ducts to the heat exchanger 29 in the hot water tank 26 and then back to the collectors. Although the collectors may only operate at 20% to 30% efficiency, their large area based upon winter conditions will more than compensate for efficiency losses. Hot water tank 26 also may be heated using the heat pump module 25, during both the winter heating and summer cooling seasons. Regardless of the manner in which the water in tank 26 is heated, the domestic hot water for household use is drawn off through outlet 127, having been heated by passing it through coil 128a in heat tank 24 and 128 in hot water tank 26. Heating is continuous, cold water being taken in through inlet 129.

4. Dehumidification

The use of cold and heat exchangers separate from and independent of heat pump module 25 makes it possible to provide warmed dehumidified air to residence 18. Air, from either the outside or from residence 18, is passed through cold exchanger 32, where it is cooled and dehumidified, and then via air handler cross-duct 50 to and through heat exchanger 28. On exiting from the heat exchanger, the warmed and dehumidified air flows through the air distributor, plank beam ducts, etc. to the rooms in residence 18.

5. Damper, Blowers and Heater Pump Module

As is apparent, the many control dampers in the system control air flow into and from the collectors, into and through any of a large number of flow paths in the air handler and distributor, and to and from the rooms in residence 18. The variety of different flow paths available make it possible to combine many of the different services (e.g., heating, cooling, heat collection and dispersal, heat transfer and hot water heating) to be combined with each other and accomplished simultaneously; and make it possible also to accomplish each in what, given existing conditions, is the most efficient manner. For example, in the winter when heat is being collected and the building heated, the particular air flow path used will depend on, inter alia, the relative temperatures of the inside and outside air, air from the collector(s) and cold exchanger, and the relative humidities of the inside and outside air. When the air in residence 18 is the warmest, the most simple heating air-flow pattern is used—blower 54 draws air into duct 42 from the building and circulates the air in a closed loop extending through heat exchanger 28 and then back into the building interior. If, however, the temperature of air at the collector exits is warmer than that of the air inside building 18, then air from the collector (rather than from the building interior) will be used to heat the building because it will take less heat from the heat exchanger and will thus reduce the amount of heat that must be transferred (by the heat pump) from the cold tank to the heat tank. If the outside air is also warmer than that inside, then still another flow pattern is used.

Outside air is drawn into the collectors, passed in order through the heat exchanger, building and cold exchanger, and then discharged to the atmosphere. If the temperature of the air in the building should happen to be cooler than the cold exchanger, then air is discharged directly to the atmosphere from the building, rather than being passed through the cold exchanger. In both these latter two patterns, advantage is taken of the fact that when the temperature of the outside air is higher than that of the air within the building, less heat will be taken from the heating system if outside air is used.

Efficient operation is enhanced also by the relatively large size of the cold, heat and hot water tanks and of the heat pump module evaporators and condensers, coupled with the provision in each tank of a cold or heat exchanger that is separate from the heat pump module. These make it possible to maintain the desired temperatures in the various tanks with minimum use of the heat pump module. The large tanks stay at relatively constant temperatures; and changes in temperature are minimized by careful selection of the particular flow path of air to and from the residence and collectors. Generally, only blowers 52, 54 are required to move conditioned air or to collect or disperse heat. If it is necessary to use heat pump module 25 to transfer heat directly from one tank to another, it normally is possible to delay doing so until a time when, for example, utility rates are low or outdoor conditions are such as to reduce the amount of power required. Even when such transfer is required, the relatively low and constant temperature differentials between the tanks and the large evaporators and condensers make it possible to select and operate a compressor at steady state rather than high peak load conditions. Heat is moved from tank to tank using heat pump module only when the proper temperatures in the cold, heat and hot water tanks cannot be maintained otherwise.

OTHER EMBODIMENTS

In other embodiments, higher temperature collector output may be obtained by fitting pieces of glass or sheets of other transparent material between adjacent overlapping edges 750 of roof tiles 62. Similarly, the exterior surfaces of the collectors may comprise solar cells from which the power necessary to operate the blowers, dampers and compressor may be obtained. Typically, such cells will convert about 19% of the energy incident upon them to electricity; the remaining energy is collected and stored by the collectors in the usual manner.

In some climates, it is desirable or necessary to provide additional heat collection/storage capacity by enlarging the heat and cold tanks, filling them with a liquid of greater heat capacity than water, and/or enlarging the collectors and reducing air speed through them. Additionally, possible freezing of the cold tank may be avoided by placing a heater in distribution duct 44 and, during periods of unusually cold weather, using it rather than heat pumped to the heat tank to heat air for residence 18. Freezing may also be avoided by providing a water coil between the cold tank and the ground below the frost line, a brine solution in the cold tank, an evaporator on the roof or wall with a condensor in the cold tank, or a tank heater.

These and other embodiments will be within the scope of the following claims.

What is claimed is:

1. A conditioning system arranged for connection to a collector of solar energy and to space to be heated or cooled, said system comprising:
   a cold tank of liquid at a relatively low temperature;
   a heat tank of liquid at a relatively high temperature;
   a heat pump for transferring heat from said cold tank to said heat tank;
   a cold exchanger in said cold tank having an air inlet and an air outlet and operative for transferring heat between air flowing therethrough and liquid in said cold tank;
   conduits attached to said cold exchanger and arranged to direct said air flowing therethrough between said cold exchanger and (i) the space to be heated or cooled by said conditioning system and (ii) said collector;
   a heat exchanger in the heat tank having an air inlet and an air outlet and operative to transfer heat between liquid in said heat tank and air flowing through said heat exchanger; and,
   conduits attached to said heat exchanger and arranged to direct air between said heat exchanger and (i) the space to be heated or cooled by said conditioning system and (ii) said collector,
   said heat exchanger being connected in parallel with said cold exchanger.

2. A conditioning system arranged for connection to a collector of solar energy and to space to be heated or cooled, said system comprising:
   a cold tank of liquid at a relatively low temperature;
   a heat tank of liquid at a relatively high temperature;
   a heat pump for transferring heat from said cold tank to said heat tank;
   a cold exchanger in said cold tank having a fluid inlet and a fluid outlet and operative for transferring heat between fluid flowing therethrough and liquid in said cold tank;
   conduits attached to said cold exchanger and arranged to direct said fluid flowing therethrough between said cold exchanger and (i) the space to be heated or cooled by said conditioning system and (ii) said collector;
   a heat exchanger in the heat tank having a fluid inlet and a fluid outlet and operative to transfer heat between liquid in said heat tank and fluid flowing through said heat exchanger; and
   conduits attached to said heat exchanger and arranged to direct fluid between said heat exchanger and (i) the space to be heated or cooled by said conditioning system and (ii) said collector,
   said fluid for heating said space being air, and said cold and heat exchangers being connected in series for directing air successively through said cold exchanger and said heat exchanger and then to said space.

3. A conditioning system comprising:
   a cold tank of liquid at a relatively low temperature;
   a heat tank of liquid at a relatively high temperature;
   a hot water tank of water at a relatively higher temperature;
   heat pump means for transferring heat from said cold tank to said heat tank and from said heat tank to said hot water tank;
   a cold exchanger in said cold tank having a fluid inlet and a fluid outlet and operative for transferring heat between fluid flowing therethrough and liquid in said cold tank;

a heat exchanger in the heat tank having a fluid inlet and a fluid outlet and operative to transfer heat between liquid in said heat tank and fluid flowing through said heat exchanger;

an evaporator in said cold tank;

a condenser in said hot water tank;

a condenser and an evaporator in said heat tank;

a compressor, said compressor being selectively operable in a first mode to circulate a refrigerant through said cold tank evaporator and said heat tank condenser to transfer heat from said cold tank to said heat tank, and in a second mode to circulate refrigerant through said heat tank evaporator and said hot water tank condensor to transfer heat from said heat tank to said hot water tank; and, conduits attached to said cold exchanger and said heat exchanger and arranged to direct fluid between said exchangers and the space to be heated or cooled by said conditioning system.

4. A system as claimed in claim 3 including a valving connected to said condensers and evaporators selectively operable to control the flow of said refrigerant when said compressor is operating in either of said first and second modes.

5. A conditioning system comprising:

a cold tank of liquid at a relatively low temperature;

a heat tank of liquid at a relatively high temperature;

a hot water tank of water at a relatively higher temperature;

heat pump means for transferring heat from said cold tank to said heat tank and from said heat tank to said hot water tank;

a cold exchanger in said cold tank having a fluid inlet and a fluid outlet and operative for transferring heat between fluid flowing therethrough and liquid in said cold tank;

a heat exchanger in the heat tank having a fluid inlet and a fluid outlet and operative to transfer heat between liquid in said heat tank and fluid flowing through said heat exchanger;

a heat exchanger in said hot water tank having a fluid inlet and a fluid outlet and operative to transfer heat between fluid flowing therethrough and liquid in said hot water tank; and, conduits attached to said cold exchanger and said heat exchanger and arranged to direct fluid between said exchangers and the space to be heated or cooled by said conditioning system.

6. A conditioning system comprising:

a cold tank of liquid at a relatively low temperature;

a heat tank of liquid at a relatively high temperature;

a heat pump for transferring heat from said cold tank to said heat tank;

a cold exchanger in said cold tank having a fluid inlet and a fluid outlet and operative for transferring heat between fluid flowing therethrough and liquid in said cold tank;

a heat exchanger in the heat tank having a fluid inlet and a fluid outlet and operative to transfer heat between liquid in said heat tank and fluid flowing through said heat exchanger; and, conduits attached to said cold exchanger and said heat exchanger and arranged to direct fluid between said exchangers and the space to be heated or cooled by said conditioning system, said conduits including and air handler mounted adjacent said tanks, said air handler including ports arranged for connection to each of an inlet from said space, an outlet to said space, an inlet from a solar collector or other source of heated fluid, an outlet to said collector or other source, and the inlet and outlet of each of said exchangers;

ducts extending between said ports; and control baffles for controlling flow in said ducts and between said ports, said ducts including a main space inlet duct connected to the ports and a main collector or other source inlet duct each to the inlets of said of said exchangers and to a respective one of the ports from said space and from said collector or other source, and a main space outlet duct and a main collector or other source or duct connected to the ports from the outlets of each of said exchanger and to a respective one of the ports to said space and said collector or other source, and said baffles permitting fluid in each of said main inlet ducts to flow to a selected one or more of said exchangers and to prevent fluid in said main inlet ducts from flowing to a not-selected one of said exchangers.

7. The system of claim 6 wherein said ducting includes a first cross-over duct extending between said main space inlet and outlet ducts and a second cross-over duct extending between said main collector or other source inlet and outlet ducts.

8. The system of claim 7 wherein said handler comprises a plurality of modular blocks arranged in two layers, one of said layers including blocks defining said main space inlet, main space outlet and first cross-over ducts, and the other of said layers including blocks defining said second cross-over duct and said main collector or other source inlet and outlet ducts.

9. The system of claim 7 including reversible blowers mounted in one of said main space ducts and one of said main collector or other source ducts.

10. The system of claim 7 wherein said handler comprises a plurality of blocks mounted in a generally rectangular matrix, portions of selected ones of said blocks being removed to define said ducts and said control baffles being mounted between adjacent pairs of said blocks.

11. The system of claim 7 including an air distributor connected between said ports of said air handler and ducting within said space and said collector or other source, said air distributor comprising:

a first set of generally co-planar longitudinally extending ducts each connected to a said port of said air handler; and a second set of generally co-planar longitudinally extending ducts connected to said ducting within said space and to said collector or other source, said first and second sets of ducts being mounted in parallel planes adjacent each other with the ducts of one set generally perpendicular to the ducts of the second set, and ports connecting each of said ducts of said first set to a selected duct of said second set.

12. The system of claim 11 wherein said second set of ducts includes a plurality of pairs of ducts each connected to a said collector or other source and to said first set of ducts.

13. The system of claim 12 including a control baffle in each of said ports of said air distributor controlling air flow therethrough.

14. A conditioning system arranged for connection to a collector of solar energy and to space to be heated or cooled, said system comprising:
- a cold tank of liquid at a relatively low temperature;
- a heat tank of liquid at a relatively high temperature;
- a heat pump for transferring heat from said cold tank to said heat tank;
- a cold exchanger in said cold tank having a fluid inlet and a fluid outlet and operative for transferring heat between fluid flowing therethrough and liquid in said cold tank;
- conduits attached to said cold exchanger and arranged to direct said fluid flowing therethrough between said cold exchanger and (i) the space to be heated or cooled by said conditioning system and (ii) said collector;
- a heat exchanger in the heat tank having a fluid inlet and a fluid outlet and operative to transfer heat between liquid in said heat tank and fluid flowing through said heat exchanger; and,
- conduits attached to said heat exchanger and arranged to direct fluid between said heat exchanger and (i) the space to be heated or cooled by said conditioning system and (ii) said collector,
- said conduits including within the building structure defining said space,
- floor plank beams defining generally horizontally extending interior ducts,
- wall slabs defining generally vertically extending interior ducts, and
- elbow sections each abutting an adjacent said floor plank beam and an adjacent said wall slab and including an interior duct providing for flow of air between said ducts of said adjacent beam and slab.

15. The system of claim 14 wherein said floor plank beams are of extruded concrete.

16. The system of claim 15 wherein a said wall slab comprises multiple sheets of cellular glass bonded together to define said ducts within said slab.

17. A conditioning system comprising:
- a cold tank of liquid at a relatively low temperature;
- a heat tank of liquid at a relatively high temperature;
- a heat pump for transferring heat from said cold tank to said heat tank;
- a cold exchanger in said cold tank having a fluid inlet and a fluid outlet and operative for transferring heat between fluid flowing therethrough and liquid in said cold tank;
- a heat exchanger in the heat tank having a fluid inlet and a fluid outlet and operative to transfer heat between liquid in said heat tank and fluid flowing through said heat exchanger; and,
- conduits attached to said cold exchanger and said heat exchanger and arranged to direct fluid between said exchangers and the space to be heated or cooled by said conditioning system,
- said conduits including within the building structure defining said space,
- floor plankboards defining generally horizontally extending interior ducts,
- wall slabs defining generally vertically extending interior ducts, and
- elbow sections each abutting an adjacent said floor plank beam and an adjacent said wall slab and including an interior duct providing for flow of air between said ducts of said adjacent beam and slab,
- said floor plank beams being of extruded concrete, and
- a said wall slab comprising a duct section defining a generally vertical interior duct, a collector section mounted exteriorly of said duct section and defining an exterior collector surface and therebehind an air flow passage, and a plurality of heat conductors extending from closely adjacent said exterior collector surface to within said air flow passage.

18. A conditioning system comprising:
- a cold tank of liquid at a relatively low temperature;
- a heat tank of liquid at a relatively high temperature;
- a heat pump for transferring heat from said cold tank to said heat tank;
- a cold exchanger in said cold tank having a fluid inlet and a fluid outlet and operative for transferring heat between fluid flowing therethrough and liquid in said cold tank;
- a heat exchanger in the heat tank having a fluid inlet and a fluid outlet and operative to transfer heat between liquid in said heat tank and fluid flowing through said heat exchanger;
- conduits attached to said cold exchanger and said heat exchanger and arranged to direct fluid between said exchangers and the space to be heated or cooled by said conditioning system,
- a hot water tank of liquid at a relatively higher temperature,
- the walls of said cold, heat and hot water tanks being arranged such that a common wall between two of said tanks abuts a common wall between one of said two and a third of said tanks, and
- said heat pump being positioned adjacent and extends through said abutting walls with a portion thereof positioned within each of said tanks.

19. The system of claim 18 wherein said heat pump includes a compressor within said cold tank and a compressor motor within a tank other than said cold tank.

20. A conditioning system comprising:
- a cold tank of liquid at a relatively low temperature;
- a heat tank of liquid at a relatively high temperature;
- a heat pump for transferring heat from said cold tank to said heat tank;
- a cold exchanger in said cold tank having a fluid inlet and a fluid outlet and operative for transferring heat between fluid flowing therethrough and liquid in said cold tank;
- a heat exchanger in the heat tank having a fluid inlet and a fluid outlet and operative to transfer heat between liquid in said heat tank and fluid flowing through said heat exchanger; and,
- conduits attached to said cold exchanger and said heat exchanger and arranged to direct fluid between said exchangers and the space to be heated or cooled by said conditioning system,
- each of said exchangers comprising a hollow, generally U-shaped section positioned in a said tank with the legs of said U generally vertically directed, and a plurality of generally planar heat conductors extending through said section such that portions of said heat conductors without said section are exposed to liquid in said tank and portions of said heat conductors within said section are exposed to fluid flowing through said section.

21. The system of claim 20 wherein each of said exchangers comprises a plurality of said sections positioned side-by-side but spaced apart from each other, and each of said conductors extends through all of said sections of said exchanger.

22. The system of claim 21 wherein conductors in the vertical legs of said sections are arranged in generally vertical planes and conductors in the horizontal leg of said sections are arranged in generally horizontal planes.

23. The system of claim 22 wherein said conductors are of expanded metal.

24. In a conditioning system comprising a tank of liquid for storage of heat and a heat exchanger having inlets and outlets attached to an air source and arranged to transfer heat between said tank of liquid and air from said air source, that improvement comprising;
- a first set of ducts providing for flow of air in a closed loop including said source and said heat exchanger;
- a second set of ducts providing for flow of air in an open path extending from the atmosphere through said source and said heat exchanger and then discharging to the atmosphere; and
- control means for causing air to flow in a selected one of said closed loop and said open path.

* * * * *

UNITED STATES PATENT AND TRADEMARK OFFICE
CERTIFICATE OF CORRECTION

PATENT NO. : 4,350,200
DATED : September 21, 1982
INVENTOR(S) : John A. McElwain It is certified that error appears in the above-identified patent and that said Letters Patent are hereby corrected as shown below:

Col. 2, line 32, "an" should be --and--;

Col. 6, line 16, "beam" should be --beams--;

Col. 6, line 20, "plank" is misspelled;

Col. 8, line 10, "walls" should be --wall--;

Col. 21, line 67, "and" should be --an--;

Col. 22, line 11, "said" first occurrence should be --each--;

Col. 24, line 31, "a" should be --the--.

Signed and Sealed this

Eighth Day of February 1983

[SEAL]

Attest:

Attesting Officer

GERALD J. MOSSINGHOFF
Commissioner of Patents and Trademarks